United States Patent
Katsumata et al.

(10) Patent No.: US 9,020,718 B2
(45) Date of Patent: Apr. 28, 2015

(54) ENGAGING FORCE CONTROL OF LOCKUP CLUTCH

(75) Inventors: Yuji Katsumata, Kawasaki (JP); Satoshi Segawa, Atsugi (JP)

(73) Assignee: Nissan Motor Co., Ltd., Yokohama-shi (JP)

(*) Notice: Subject to any disclaimer, the term of this patent is extended or adjusted under 35 U.S.C. 154(b) by 1877 days.

(21) Appl. No.: 11/476,143

(22) Filed: Jun. 28, 2006

(65) Prior Publication Data

US 2007/0005211 A1 Jan. 4, 2007

(30) Foreign Application Priority Data

Jun. 29, 2005 (JP) .................................. 2005-189462

(51) Int. Cl.
F16H 61/14 (2006.01)
B60W 10/02 (2006.01)

(52) U.S. Cl.
CPC .................................... F16H 61/143 (2013.01)

(58) Field of Classification Search
USPC ................. 701/51.67, 68, 87, 90; 477/62, 70, 477/77–80, 83–87, 162, 174–177, 180; 192/3.31
See application file for complete search history.

(56) References Cited

U.S. PATENT DOCUMENTS

| | | | | |
|---|---|---|---|---|
| 4,881,627 A | | 11/1989 | Ishii | |
| 5,679,091 A | * | 10/1997 | Salecker et al. | 477/86 |
| 6,066,072 A | * | 5/2000 | Adachi | 477/176 |
| 6,217,481 B1 | * | 4/2001 | Watanabe et al. | 477/169 |
| 6,656,084 B2 | * | 12/2003 | Inoue et al. | 477/38 |
| 7,195,581 B2 | * | 3/2007 | Segawa et al. | 477/180 |
| 2004/0082434 A1 | * | 4/2004 | Segawa et al. | 477/62 |
| 2004/0111203 A1 | * | 6/2004 | Higashimata et al. | 701/51 |
| 2004/0162184 A1 | * | 8/2004 | Segawa et al. | 477/62 |
| 2005/0101434 A1 | * | 5/2005 | Segawa et al. | 477/70 |

FOREIGN PATENT DOCUMENTS

| | | |
|---|---|---|
| EP | 0 903 517 A2 | 3/1999 |
| EP | 1 201 971 A2 | 5/2002 |
| JP | 7-71594 A | 3/1995 |
| JP | 7-239025 | 9/1995 |
| JP | 2000-145949 | 5/2000 |
| JP | 2000-240786 | 9/2000 |
| JP | 3183235 | 4/2001 |
| JP | 3230465 | 9/2001 |
| JP | 3240979 | 10/2001 |

* cited by examiner

Primary Examiner — Adam Tissot
(74) Attorney, Agent, or Firm — Foley & Lardner LLP

(57) ABSTRACT

A torque converter (1) connecting an engine (14) and a transmission (15) of a vehicle is provided with a lockup clutch (2), and a controller (5) is programmed to increase an engagement force of a lockup clutch (2) under open loop control before shifting to feedback control of the engaging force using a target slip rotation speed. When an engine output torque rapidly decreases during open loop control (S59, S60), the controller (5) decreases the engaging force according to a variation amount of the engine output torque (S61, S65), thereby preventing an unintentional sudden engagement of the lockup clutch (2) due to decrease in the engine output torque.

19 Claims, 21 Drawing Sheets

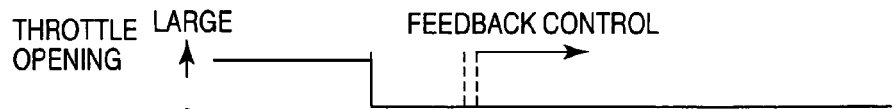
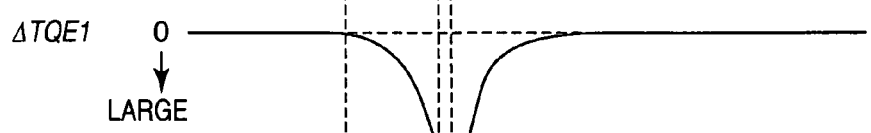
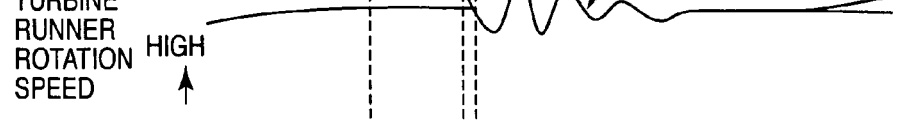
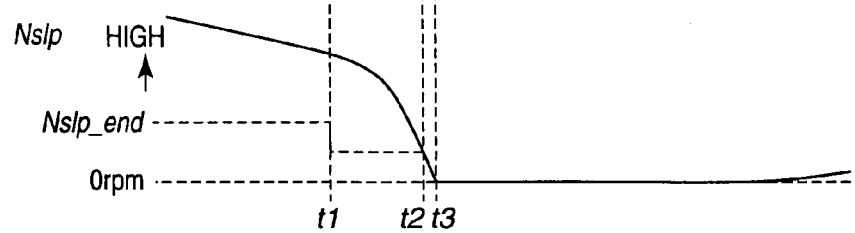

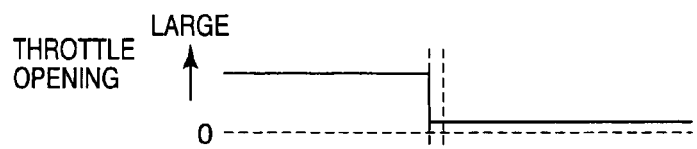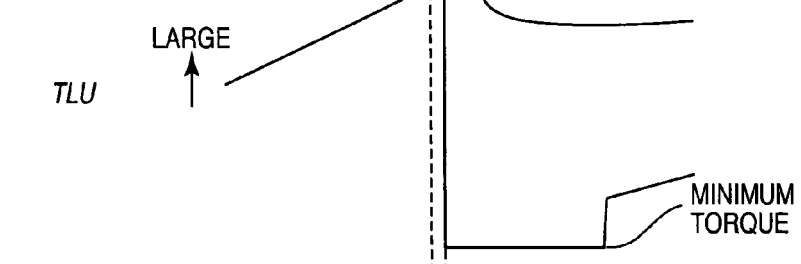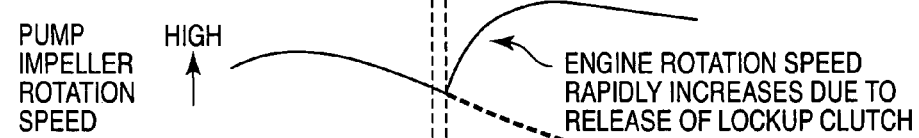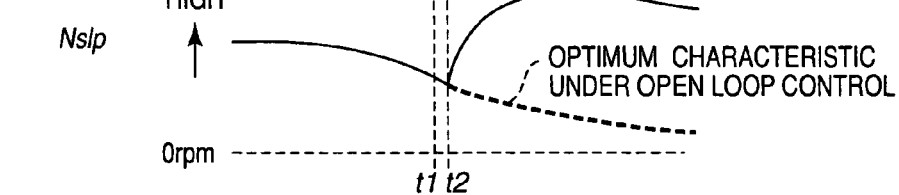

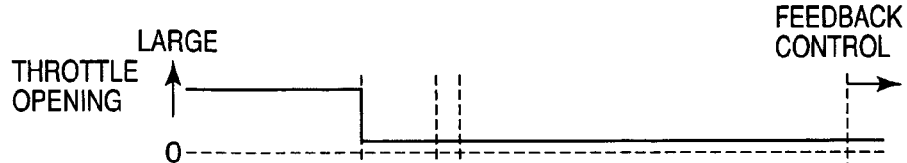
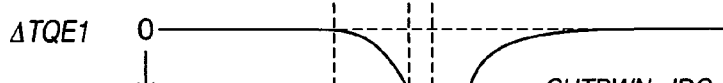
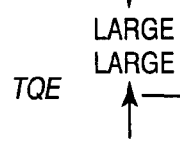
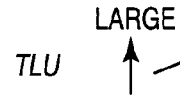
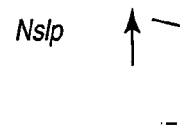
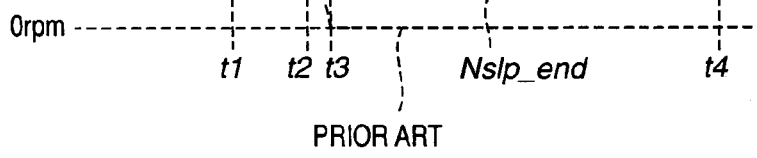

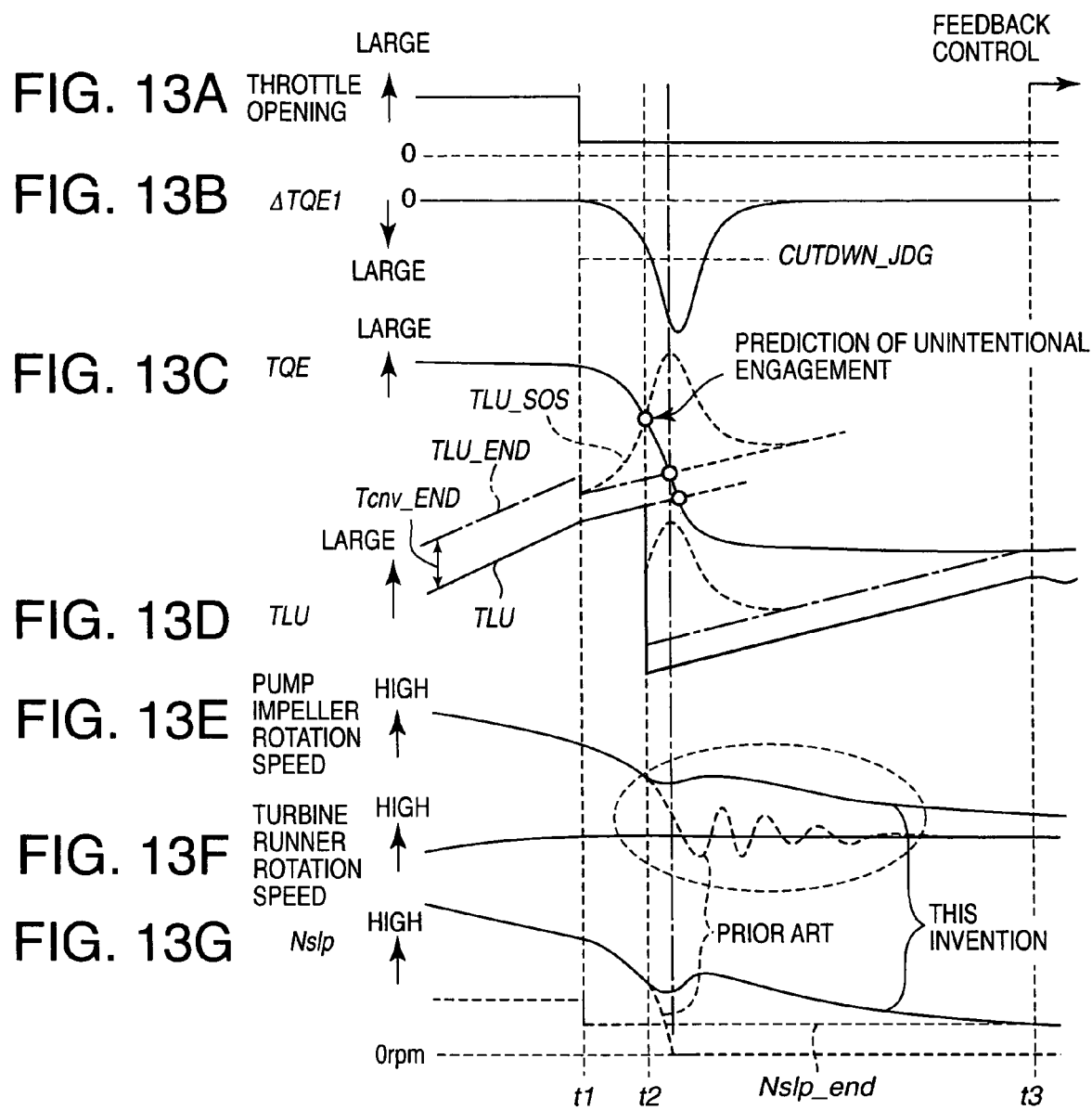

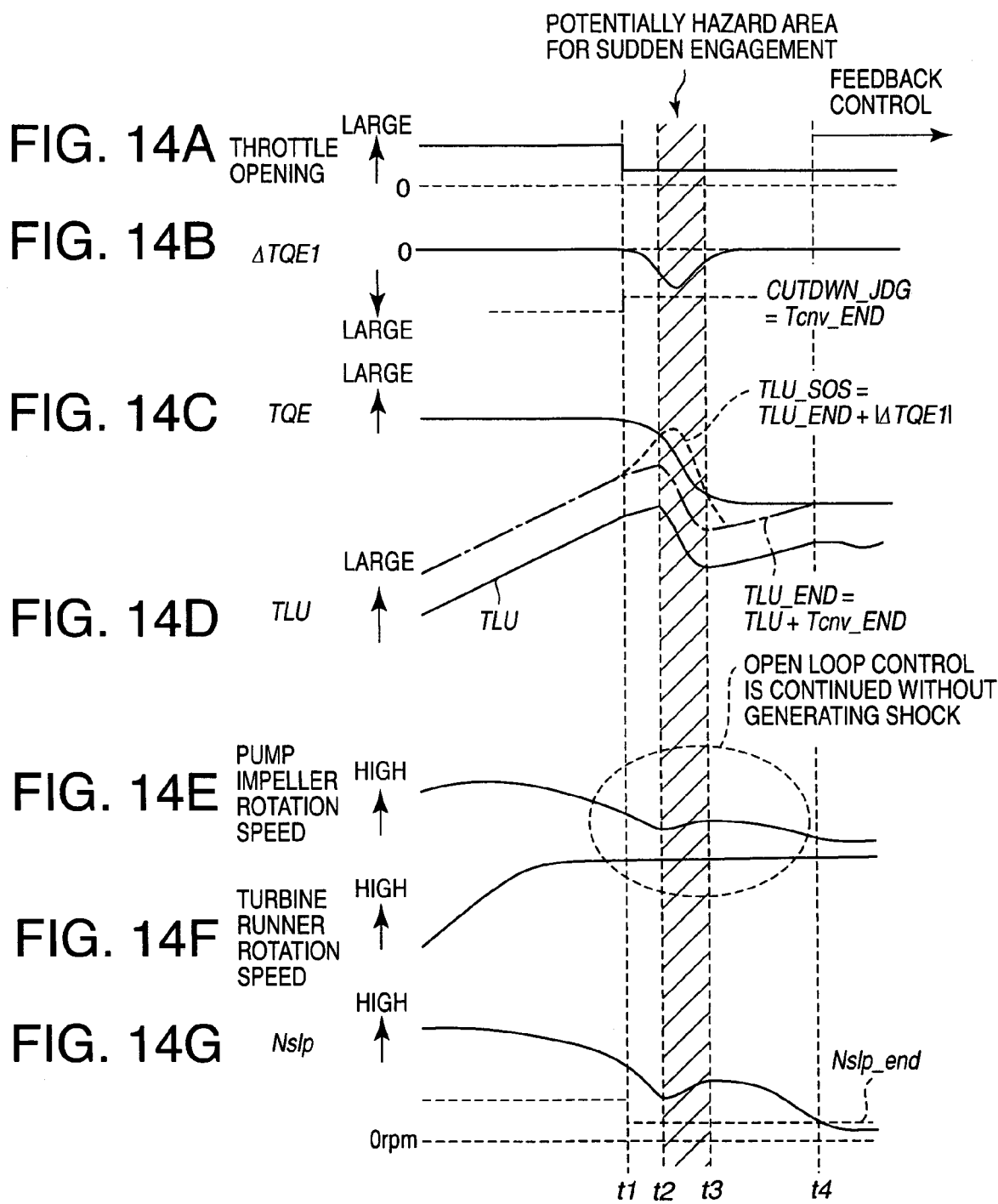

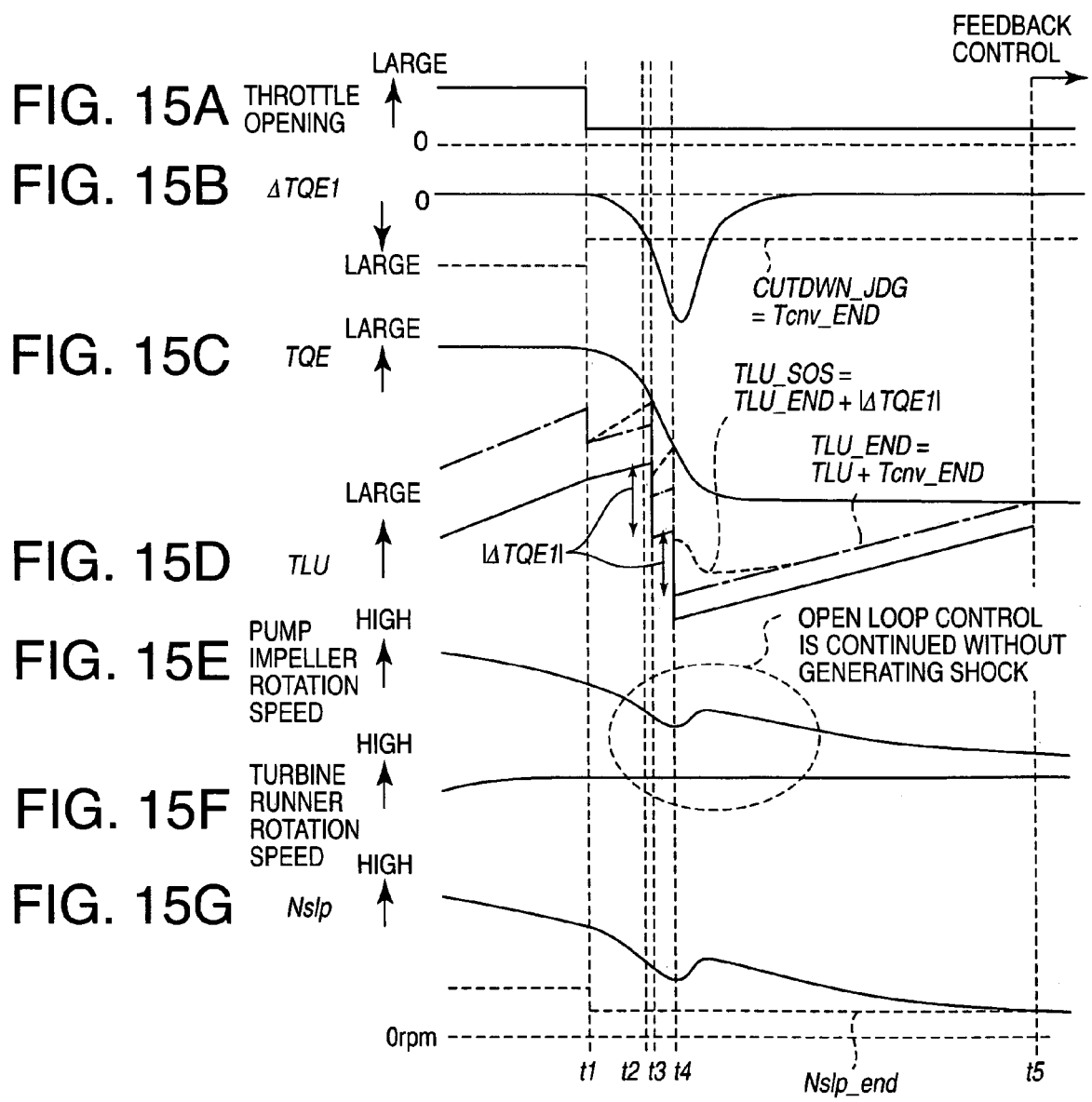

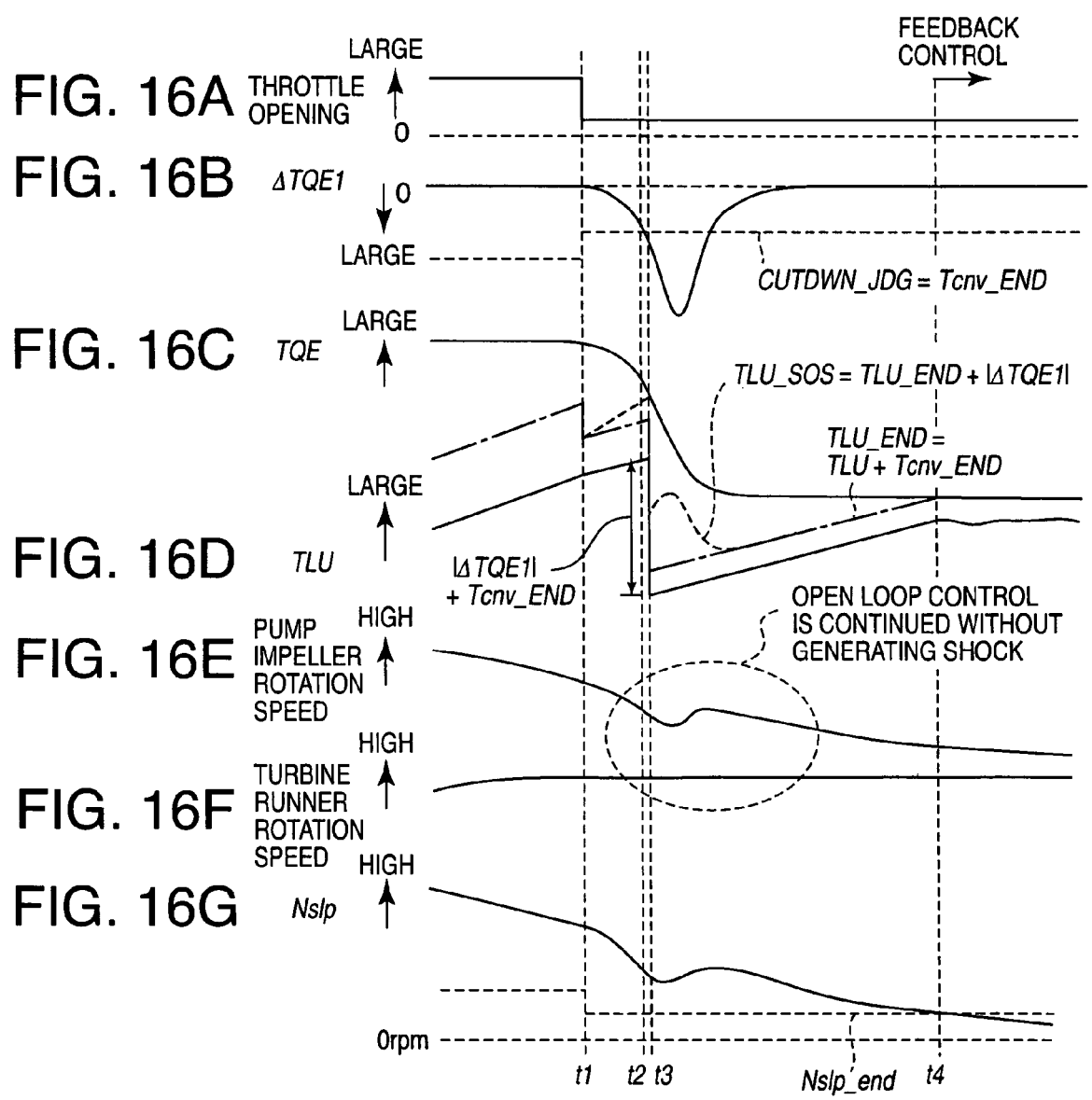

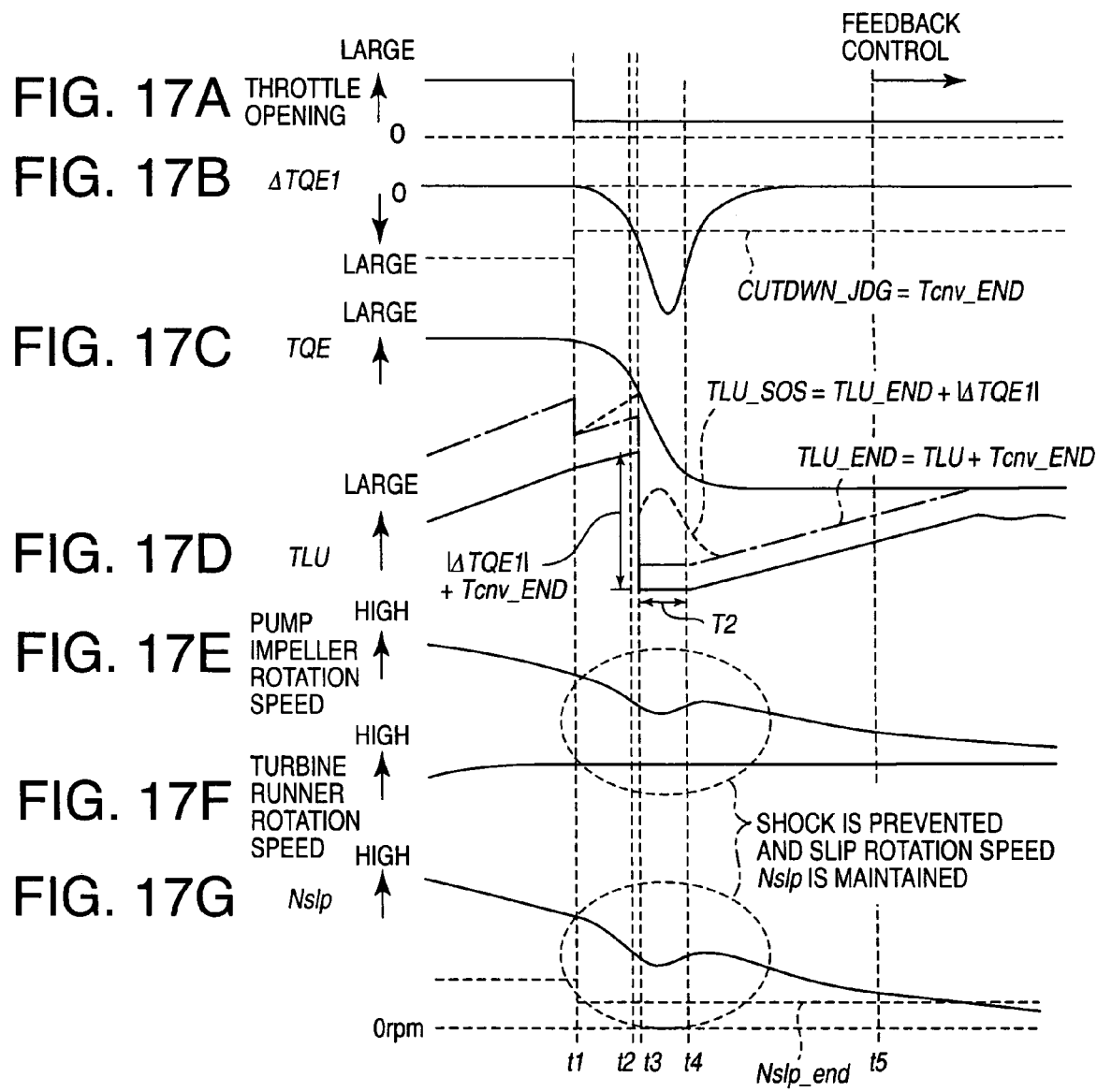

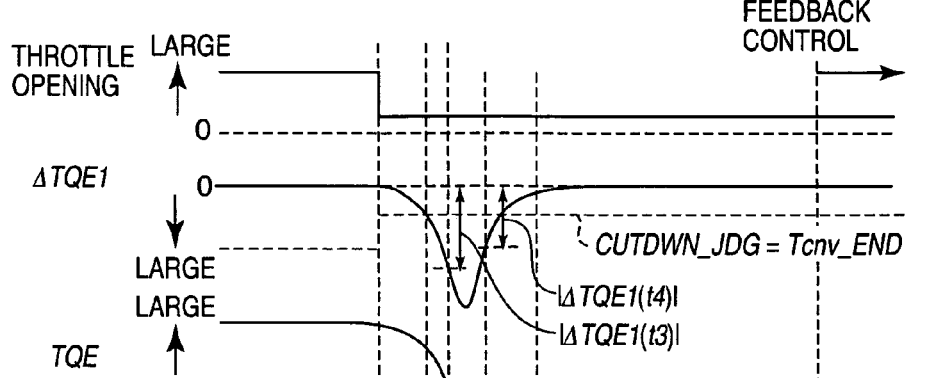
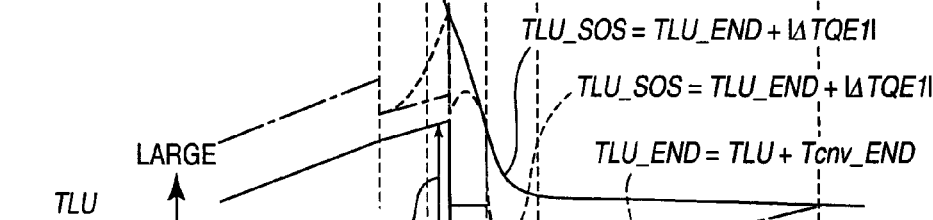
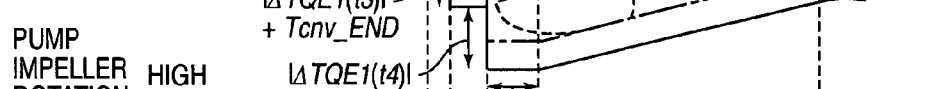

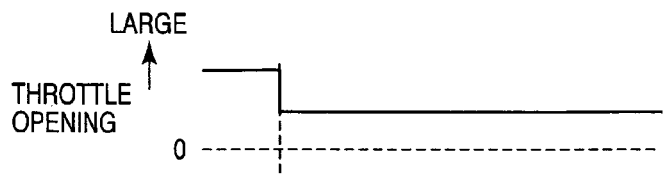
FIG. 19A  THROTTLE OPENING
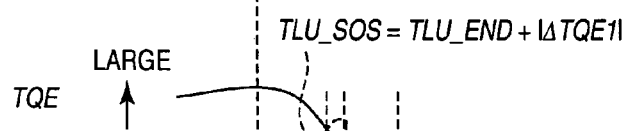
FIG. 19B  TQE
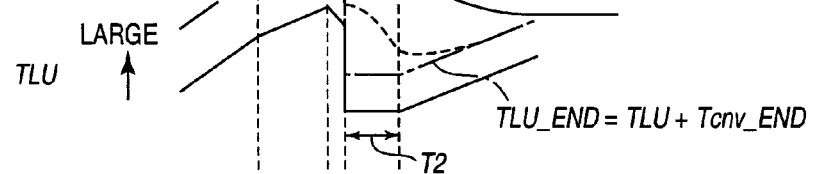
FIG. 19C  TLU
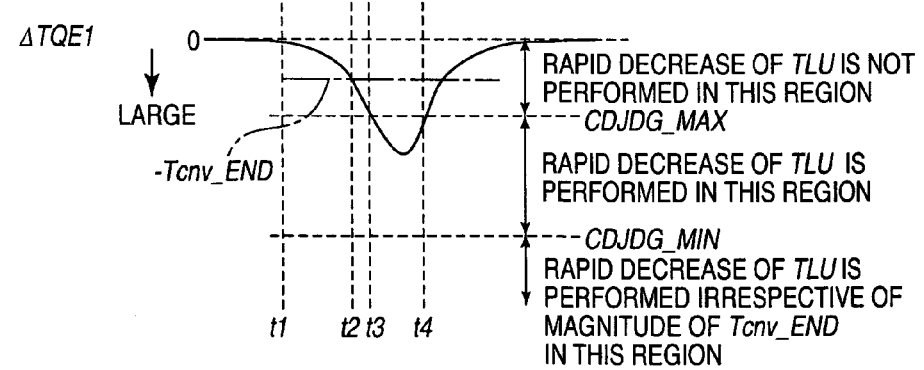
FIG. 19D  ΔTQE1

FIG. 20A THROTTLE OPENING
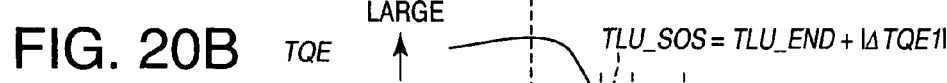
FIG. 20B TQE
FIG. 20C TLU
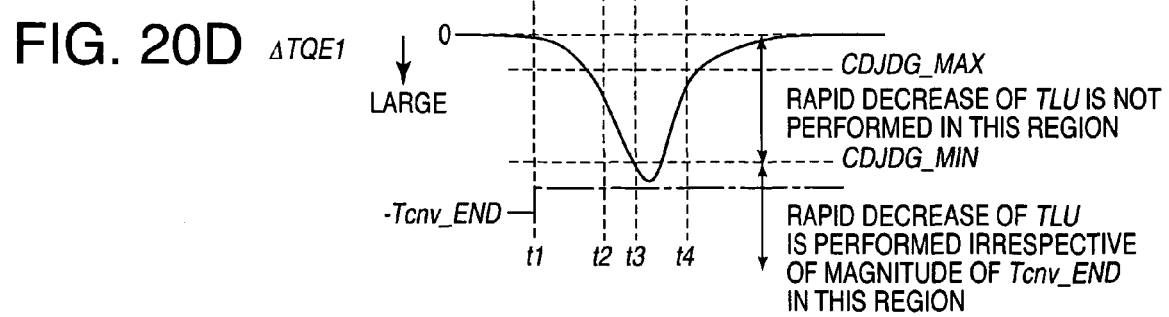
FIG. 20D ΔTQE1

ENGAGING FORCE CONTROL OF LOCKUP CLUTCH

FIELD OF THE INVENTION

This invention relates to control of an engaging force of a lockup clutch provided in a torque converter for a vehicle.

BACKGROUND OF THE INVENTION

JPH07-239025A published by Japan Patent Office in 1995 discloses a lockup clutch which engages a turbine runner with a pump impeller of a torque converter for a vehicle in order to suppress increase in fuel consumption due to slip between the pump impeller and the turbine runner in a running region where a torque multiplication function or a shock absorbing function of the torque converter is not required, The operation state of the torque converter where the turbine runner is engaged with the pump impeller is named a "lockup mode". The operation state of the torque converter where the turbine runner is released from the pump impeller and torque is transmitted only via fluid in the torque converter is named a "converter mode". The operation state of the torque converter where the turbine runner is partially engaged with the pump impeller and they transmit part of the torque therebetween in a slipping state is named a "slip mode".

The switch-over of the operation modes is performed by varying a differential pressure between an application pressure and a release pressure both of which are supplied to the lockup clutch. Herein, the minimum differential pressure produces the converter mode, while the maximum differential pressure produces the lockup mode, Selection of the operation mode is performed on the basis of a vehicle speed and a throttle opening of an internal combustion engine which drives the vehicle. When the operation mode is switched over from the converter mode to the lockup mode, the differential pressure is first increased by an open loop control. When a relative rotation speed between the pump impeller and the turbine runner (hereinafter referred to as a slip rotation speed) has decreased to a certain level as a result of this open loop control, the operation mode is switched over to the slip mode where the differential pressure is increased by feedback control and finally the lockup clutch is fully engaged.

SUMMARY OF THE INVENTION

In the process of switching over from the converter mode to the slip mode, a problem may arise when a driver of the vehicle releases the accelerator pedal while the differential pressure is increased under open loop control.

Specifically, when the accelerator pedal is released, the throttle opening of the internal combustion engine rapidly reduces to an opening corresponding to an idle running state of the engine, and accordingly the output torque of the engine rapidly decreases.

When the rotation torque of the pump impeller rapidly decreases in the torque converter in which a torque is transmitted from the pump impeller to the turbine runner in a slipping state, the pump impeller and the turbine runner may engage with each other under the same differential pressure which was applied in the state where the accelerator pedal was not released.

As a result of such an unintentional lockup of the lockup clutch, shock absorbing effect which is obtained from a slip between the pump impeller and the turbine runner is lost, and a shock exerted on one of the elements is transmitted to the other of the elements without being absorbed. In this situation, therefore, a variation in torque is likely to promote a shock.

It is therefore an object of this invention to prevent an unintentional engagement of the lockup clutch when the output torque of the engine is suddenly decreased while the differential pressure is increased by open loop control.

In order to achieve the above object, this invention provides a lockup clutch engaging force control device of a torque converter for a vehicle which transmits torque via fluid between a pump impeller connected to an engine and a turbine runner connected to a transmission.

The torque converter comprises a lockup clutch which engages the pump impeller and the turbine runner according to an engaging force.

The device comprises an engaging force regulating mechanism which regulates the engaging force and a programmable controller.

The controller is programmed to execute open loop control of the mechanism to increase the engaging force until a slip rotation speed of the pump impeller and the turbine runner reaches a predetermined value, calculate an engine output torque of the engine, and control the mechanism to decrease the engaging force when the engine output torque has decreased in the open loop control of the mechanism, in accordance with a decrease amount of the engine output torque.

This invention also provides a lockup clutch engaging force control method for the above torque converter. The method comprises executing open loop control of the mechanism to increase the engaging force until a slip rotation speed of the pump impeller and the turbine runner reaches a predetermined value, calculating an engine output torque of the engine, and controlling the mechanism to decrease the engaging force when the engine output torque has decreased in the open loop control of the mechanism, in accordance with a decrease amount of the engine output torque.

The details as well as other features and advantages of this invention are set forth in the remainder of the specification and are shown in the accompanying drawings.

BRIEF DESCRIPTION OF THE DRAWINGS

FIGS. 10A-10G are timing charts showing a result of engaging force control by a prior art control device which does not decrease the transmittable torque of the lockup clutch when an output torque of an engine has rapidly decreased.

FIGS. 11A-11F are timing charts showing a result of engaging force control by a prior art control device which releases the lockup clutch when the output torque of the engine has rapidly decreased.

FIGS. 12A-12G are timing charts showing a control result intended by this invention.

FIGS. 13A-13G are similar to FIGS. 12A-12G but show a control result in a different situation.

FIGS. 14A-14G are timing charts showing a control result according to execution of the engaging force control routine.

FIGS. 15A-15G are timing charts showing a control result according to execution of a variation of the engaging force control routine.

FIGS. 16A-16G are similar to FIGS. 15A-15G but show a control result in a different situation.

FIGS. 17A-17G are similar to FIGS. 14A-14G but show a control result in a different situation.

FIGS. 18A-18G are timing charts showing a control result in a yet different situation according to execution of the engaging force control routine FIGS. 19A-19D are timing charts showing a control result in a yet different situation according to execution of the engaging force control routine FIGS. 20A-20D are timing charts showing a control result in a yet different situation according to execution of the engaging force control routine

DESCRIPTION OF THE PREFERRED EMBODIMENTS

Figure 1:
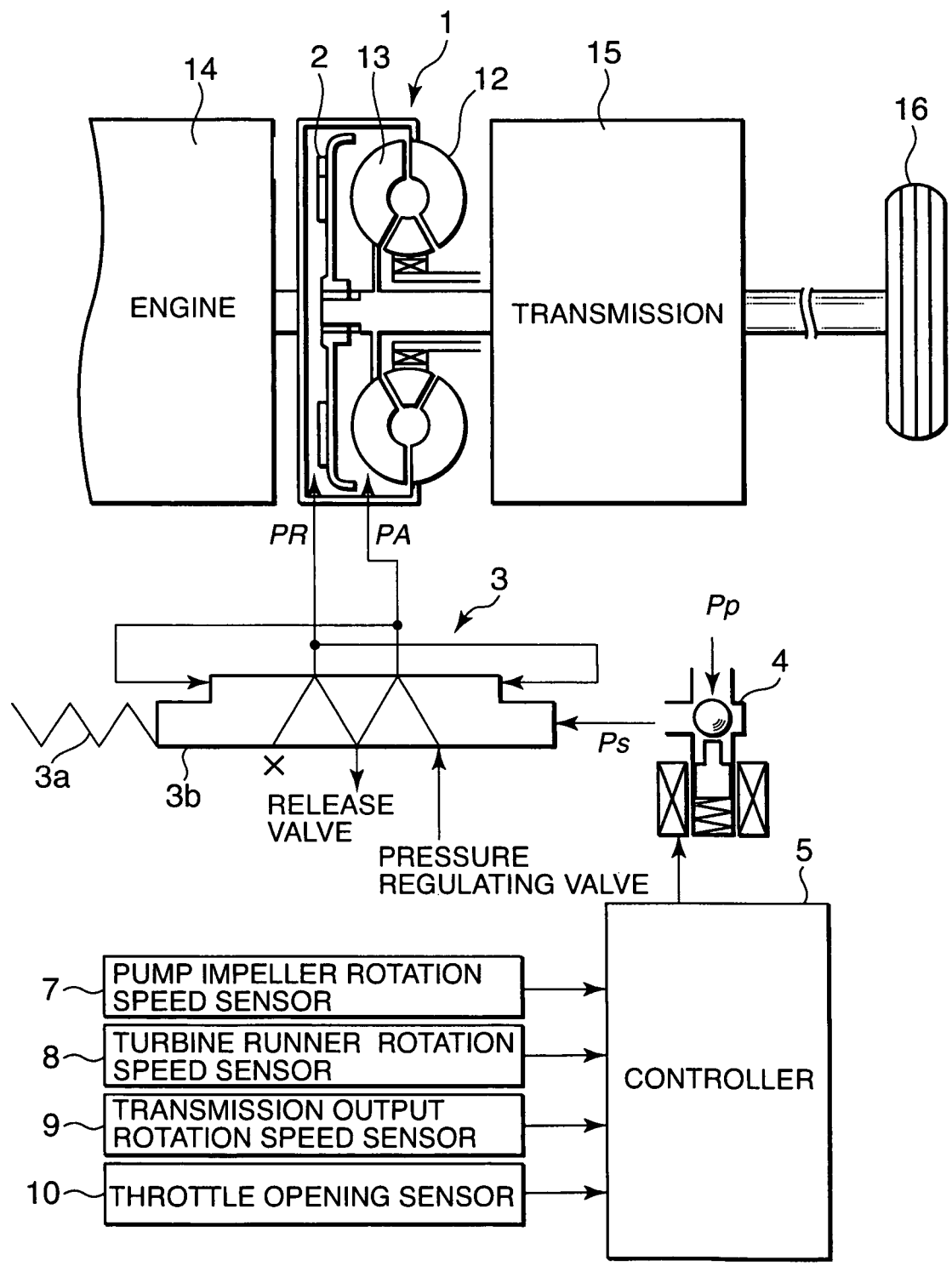
FIG. 1 is a schematic diagram of an engaging force control device according to this invention.

Referring to FIG. 1 of the drawings, a torque converter 1 for a vehicle is interposed between an internal combustion engine 14 and an automatic transmission 15 and transmits a drive torque of the engine 14 to the automatic transmission 15 via fluid.

An output torque of the automatic transmission 15 is transmitted to drive wheels 16 via a final gear.

In the torque converter 1, a pump impeller 12 connected to an output shaft of the engine 14 and a turbine runner 13 connected to an input shaft of the automatic transmission 15 are disposed facing to each other.

When the pump impeller 12 rotates according to the rotation of the internal combustion engine 14, a rotational movement is produced in the fluid filling the torque converter 1, and accordingly rotates the turbine runner 13.

The torque converter 1 comprises a lockup clutch 2. The lockup clutch 2 operates according to a differential pressure $\Delta P$ between an application pressure PA which pushes the turbine runner 13 in an engagement direction with the pump impeller 12 and a release pressure PR which pushes the turbine runner 13 in a release direction from the pump impeller 12.

When the application pressure PA is lower than the release pressure PR, the lockup clutch 2 is released or disengaged, and the pump impeller 12 and the turbine runner 13 transmit torque therebetween via the fluid which fills the torque converter 1. This state of torque transmission is named a "converter mode".

When the application pressure PA is higher than the release pressure PR, the lockup clutch 2 engages according to the differential pressure $\Delta P$ between the application pressure PA and the release pressure PR. When the differential pressure $\Delta P$ is not large, the pump impeller 12 and the turbine runner 13 transmit torque therebetween according to the differential pressure $\Delta P$ while slipping with each other. This state of torque transmission is named a "slip mode".

When the differential pressure $\Delta P$ becomes greater than a predetermined value, the pump impeller 12 and the turbine runner 13 will rotate together without slipping, and transmit all the torque via the lockup clutch 2. This state of torque transmission is named a "lockup mode".

A transmittable torque by the lockup clutch 2 depends on the engaging force thereof, in other words on the differential pressure $\Delta P$. As the differential pressure $\Delta P$ increases, the engaging force of the lockup clutch 2 increases and the transmittable torque thereof also increases. The differential pressure $\Delta P$ is controlled by a differential pressure control valve 3.

The differential pressure control valve 3 is a spool valve which controls the differential pressure $\Delta P$ by controlling the application pressure PA and the release pressure PR in response to a displacement of a spool 3b. The application pressure PA and the release pressure PR are applied to the spool 3b in opposite directions. A spring 3A pushes the spool 3b in the same direction as the application pressure PA. A signal pressure PS supplied from a lockup solenoid 4 is also applied to the spool 3 in the same direction as the release pressure PR. The spool 3b is maintained at a position where these forces balance.

The lockup solenoid 4 generates the signal pressure PS from a pump pressure PP as a pressure source according to a lockup duty D output as a signal from a controller 5. The controller 5 controls the engaging force of the lockup clutch 2 via the output of the lockup duty D in the form of a signal.

The controller 5 is constituted by a microcomputer comprising a central processing unit (CPU), a read-only memory (ROM), a random access memory (RAM), and an input/output interface (I/O interface). The controller may be constituted by a plurality of microcomputers.

In order to control the engaging force of the lockup clutch 2, signals are input into the controller 5 from a pump impeller rotation speed sensor 7 which detects a rotation speed of the pump impeller 12, a turbine runner rotation speed sensor 8 which detects a rotation speed of the turbine runner 13, a transmission output rotation speed sensor 9 which detects an output rotation speed of the automatic transmission 15, and a throttle opening sensor 10 which detects a throttle opening degree of a throttle with which the internal combustion engine 14 is provided.

Next, referring to FIG. 2, an engaging force control routine of the lockup clutch 2 performed by the controller 5 will be described.

The controller 5 repeatedly executes this routine at intervals of twenty milliseconds while the vehicle is running.

Figure 3:
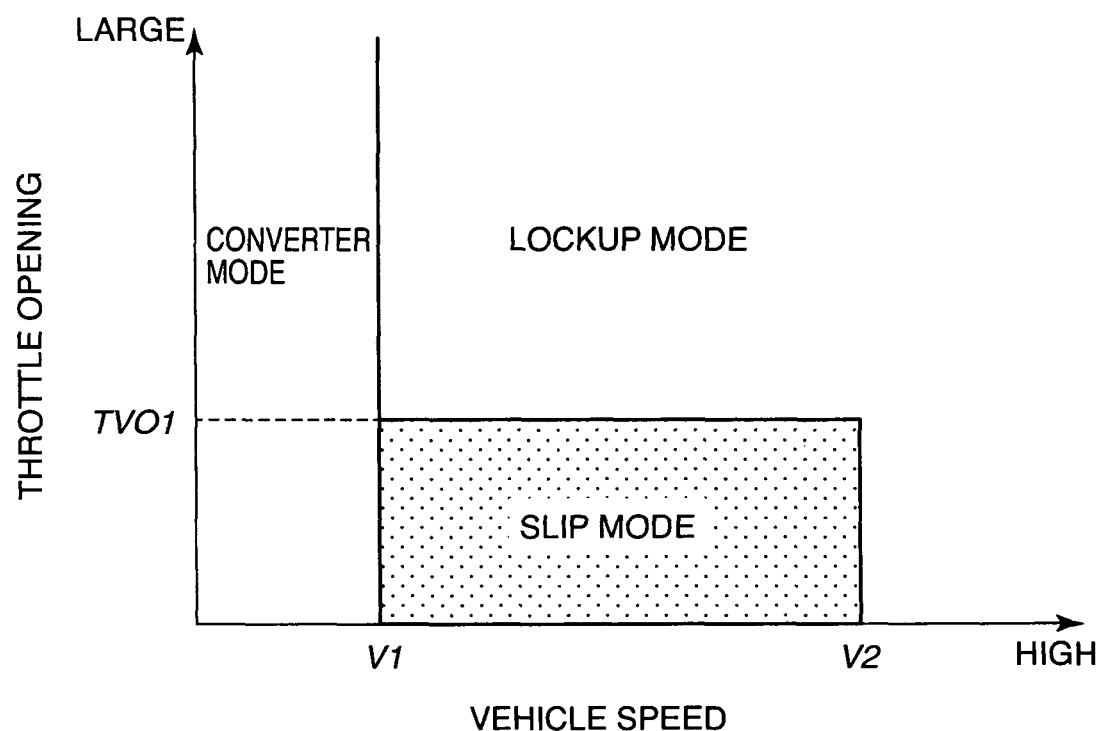
FIG. 3 is a diagram showing the characteristics of a map of operation modes of a lockup clutch stored by the controller according to this invention.

In a first step S1, the controller 5 looks up a vehicle speed and the throttle opening in a map previously stored in the ROM in order to determine if the vehicle running condition requires the slip mode of the lockup clutch 2. The characteristics of this map are shown in FIG. 3. Since the vehicle speed and the output rotation speed of the automatic transmission 15 are in a fixed relation, the vehicle speed is calculated from the output rotation speed of the automatic transmission 15 by multiplying a predetermined factor.

Referring now to FIG. 3, in a region where the vehicle speed is lower than a predetermined speed V1, the converter mode is always required irrespective of the throttle opening.

In a region where the vehicle speed is higher than the predetermined speed V1 and lower than a predetermined speed V2, the slip mode is required when the throttle opening is smaller than a predetermined opening TVO1 and the lockup mode is required when the throttle opening is not smaller than the predetermined opening TVO1. Further, the lockup mode is always required irrespective of the throttle opening in a region where the vehicle speed is not lower than the predetermined speed V2.

When it is determined in the step S1 that the vehicle running condition requires the slip mode, the controller 5 executes the processing of a step S4. When it is not, the controller 5 executes the processing of a step S2.

In the step S2, the controller 5 determines if the vehicle running condition requires the lockup mode. When it is determined that the vehicle running condition requires the lockup mode, the controller 5 executes the processing of a step S3.

When this is not the case, it means the vehicle running condition requires the converter mode. In this case, the controller 5 outputs in a step S14 a command signal to operate the torque converter 1 in the converter mode, or in other words, to maintain the differential pressure ΔP at a minimum value, to the lockup solenoid 4. After the processing of the step S14, the controller 5 terminates the routine. In the processing of the step S14, in order to avoid a rapid variation in the differential pressure ΔP, it is preferable to limit the variation amount of the command signal at an execution of the step S14. The controller 14 is programmed to remember the fact of execution of the step S14 for use on the next occasion when the routine is executed, In contrast, in the step S3, the controller 5 determines if the lockup operation of the lockup clutch 2 is complete. This determination is performed by determining if the differential pressure ΔP has exceeded a predetermined lockup complete value.

When it is determined that the lockup operation is complete, the controller 5 maintains the differential pressure ΔP at the current value in a step S13 and terminates the routine.

When it is determined in the step S13 that the lockup operation is not complete, the controller 5 executes the processing of the step S4.

In the step S4, the controller 5 determines if the lockup clutch 2 was operated in the converter mode on the last occasion when the routine was executed. This determination is performed by determining if the processing of the step S14 was executed on the last occasion of routine execution.

When the determination in the step S4 is affirmative, it means that the required operation mode of the lockup clutch 2 has been switched over from the converter mode to the slip mode or the lockup mode. In this case, the controller 5 executes the processing of steps S5 and S6 for the preparation of open loop control of the differential pressure ΔP.

Figure 4:
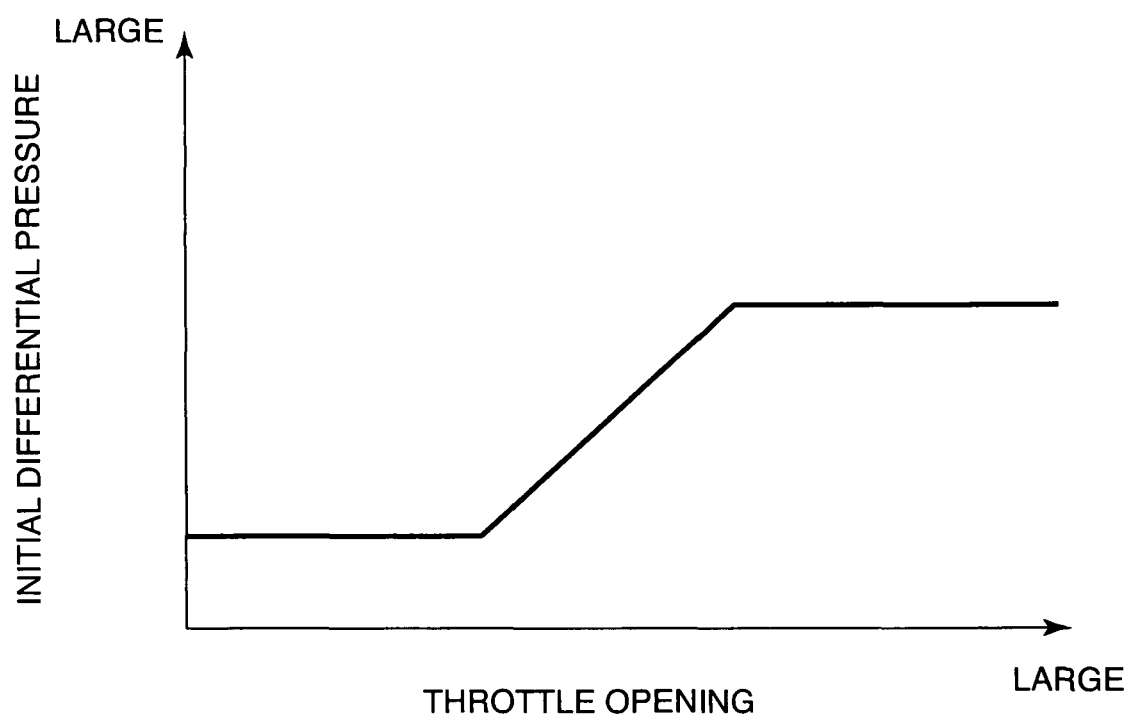
FIG. 4 is a diagram showing the characteristics of a map stored by the controller defining the relation between a throttle opening and an initial differential pressure.

In the step S5, the controller 5 determines an initial differential pressure from the throttle opening by referring to a map previously stored in the ROM of the controller 5 which has characteristics shown in FIG. 4.

In the step S6, the controller 5 causes an open loop control flag fOPEN_EXE to have a value of one. After the processing of the step S6, the controller executes the processing of a step S7. When the determination in the step S4 is negative, in other words the lockup clutch 2 was operated in the slip mode or in the lockup mode on the last occasion of routine execution, the controller 5 skips the processing of the steps S5, S6, and executes the processing of the step S7.

In the step S7, the controller 5 determines if the open loop control flag fOPEN_EXE has a value of one. If the loop control flag fOPEN_EXE has a value of one, the controller 6 determines in a step S8 if open loop control in increasing the differential pressure ΔP should be terminated. This determination is performed by determining if the following relation (1) holds. When the relation (1) holds, it means that open loop control to increase the differential pressure ΔP should be terminated.

$$Nslp < Nslp\_end \quad (1)$$

where, Nslp=real slip rotation speed, and
Nslp_end=open loop control termination slip rotation speed at which open loop control is terminated.

Figure 5:
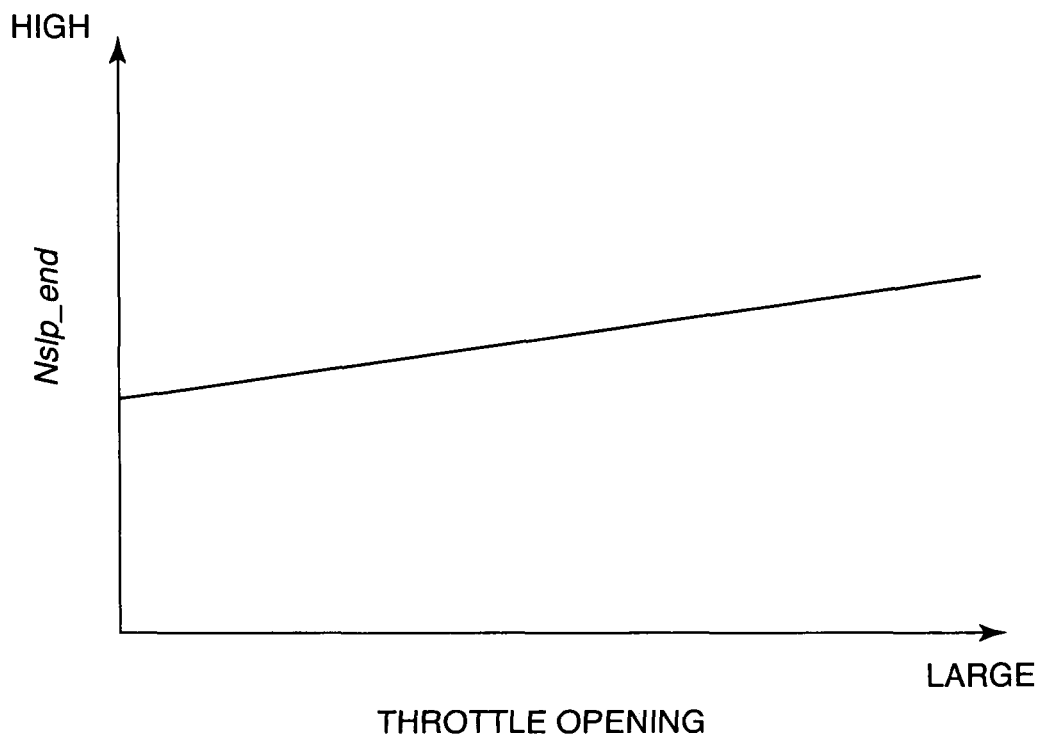
FIG. 5 is a diagram showing the characteristics of a map stored by the controller defining the relation between the throttle opening and an open loop control termination slip rotation speed Nslp_end.

The real slip rotation speed Nslp is equal to a difference between the rotation speed of the pump impeller 12 and that of the turbine runner 13. The open loop control termination slip rotation speed Nslp_end is determined from the throttle opening by referring to a map previously stored in the ROM of the controller 5. The characteristics of this map are shown in FIG. 5.

Figure 6A:
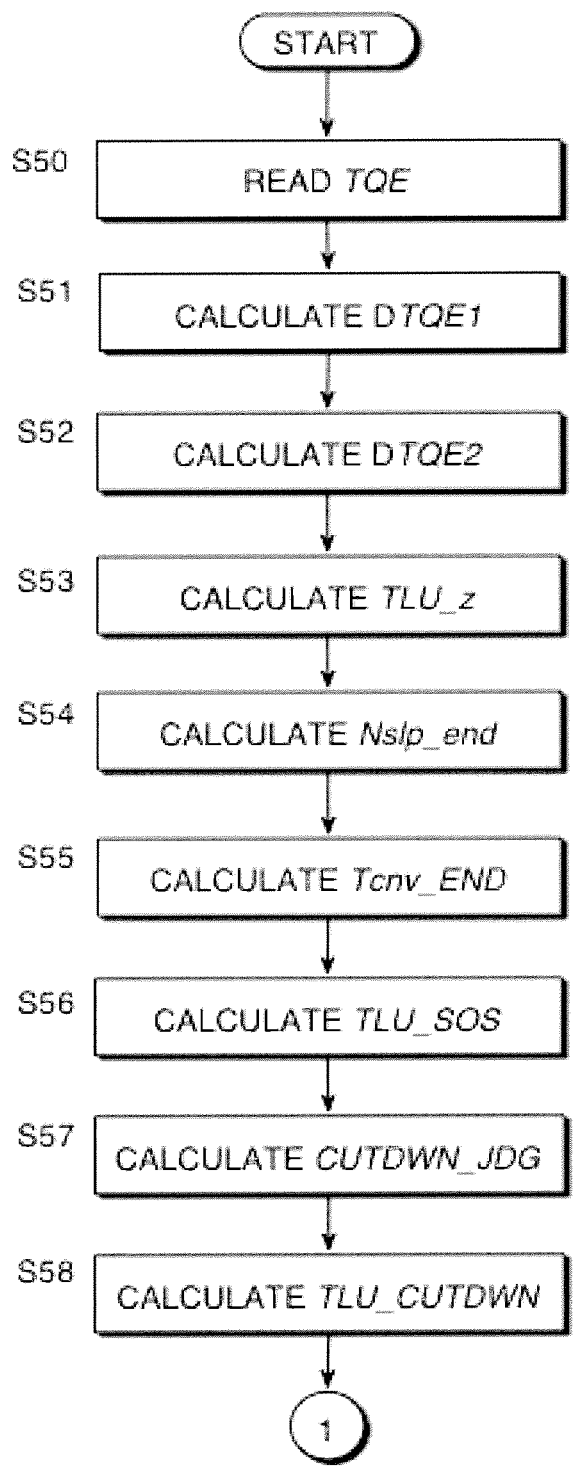
FIGS. 6A and 6B are flowcharts for describing an open loop control subroutine executed by the controller.
Figure 6B:
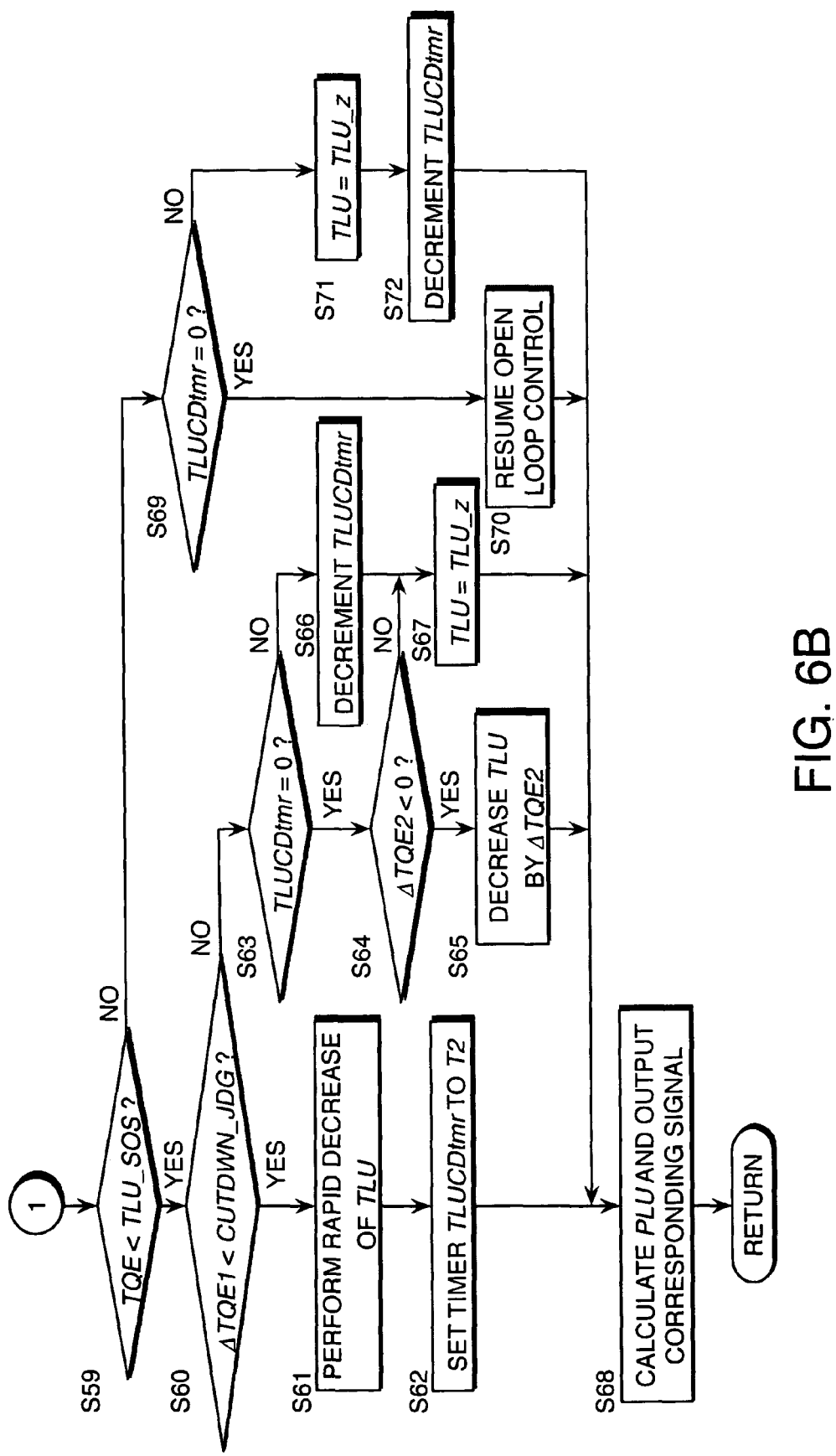

When the relation (1) does not hold in the step S8, the controller 5 executes an open loop control subroutine shown in FIGS. 6A and 6B in a step S9 to increase the differential pressure ΔP. After the processing of the step S9, the controller 5 terminates the routine.

When the relation (1) holds in the step S8, the controller 5 executes first an initialization process of a control system in a step S10 so as to terminate open loop control of the differential pressure ΔP and start feedback control thereof. Specifically, the controller 5 initializes, for example, an integrator to be used in feedback control, in accordance with a differential pressure command value set for the start of the slip mode. An initializing method of a control system is known by JP2000-145949A published by Japan Patent Office in 2000. Providing that the known method is applied in the step S10, the detailed description of the initialization process is herein omitted.

In a next step S11, the controller 5 resets the open loop control flag fOPEN_EXE to zero. After the processing of the step S11, the controller 5 executes feedback control of the differential pressure ΔP in a step S12.

When the open loop control flag fOPEN_EXE does not have a value of one in the step S7, the controller 5 skips the processing of the steps S8-S10 and executes the processing of the step S12.

The feedback control of the differential pressure ΔP will now be described.

In the feedback control of the differential pressure ΔP, the controller 5 calculates the real slip rotation speed Nslp of the lockup clutch 2, which equals a difference between the rotation speed of the pump impeller 12 and the rotation speed of the turbine runner 13 in the torque converter 1. The controller 5, on the other hand, calculates a target slip rotation speed of the lockup clutch 2 based on the running condition of the vehicle. The controller 5 sets an input value of a feedback compensator equal to a slip rotation speed deviation which is a difference between the real slip rotation speed and the target slip rotation speed, and feedback controls the engagement pressure of the lockup clutch 2, i.e., the differential pressure ΔP, such that the input value into the feedback compensator becomes zero.

The above feedback control of the differential pressure ΔP in the slip mode is known by Japanese Patent Serial No. 3240979, 3183235, 3230465 respectively. Providing that the known method is applied in the step S12, the detailed description of the processing of the step S12 is herein omitted. After executing the processing of the step S12, the controller 5 terminates the routine.

It should be noted however that the processing of the step S12 is executed not only on the occasion when the slip mode is continued but also on the occasion when the determination in the step S3 becomes negative, or in other words when the lockup mode is required but the lockup operation is still not complete. In the latter situation, the differential pressure ΔP is feedback controlled to a target value as in the case of feedback control of the differential pressure ΔP in the slip mode, as disclosed by JP2000-240786A published by Japan Patent Office in 2000. Since the processing of feedback control of the differential pressure ΔP is identical in both occasions, the processing is herein represented by the single step S12.

As described hereintofore, switch-over to feedback control of the differential pressure ΔP from open loop control thereof depends on the determination in the step S8 as to whether or not the relation (1) holds.

However, if the driver releases the accelerator pedal during a period when the differential pressure ΔP is increased under open loop control, the output torque of the engine 14 rapidly decreases, and the slip rotation speed Nslp of the lockup clutch 2 decreases accordingly. As a result, the lockup clutch 2 may be engaged and come into a lockup state under the same differential pressure ΔP.

Generally, in such a case control of the differential pressure ΔP is switched over from the open loop control to feedback control, and the controller 5 tries to control the differential pressure ΔP to a target value. However, when the rotation speed of the engine 14 rapidly decreases, due to a response delay which inherently exists in feedback control, the slip rotation speed Nslp of the lockup clutch 2 becomes lower than the open loop control termination slip rotation speed Nslp_end, and the internal combustion engine 14 and the automatic transmission 15 are directly connected via the lockup clutch 2 that is now fully engaged In this situation, a shock absorbing effect that the lockup clutch 2 in the slip mode brings about is not obtained, and a torque variation in one of the pump impeller 12 and turbine runner 13 is directly transmitted to the other of the pump impeller 12 and turbine runner 13. This situation lasts until feedback control becomes effective, and in the meantime a torque variation in either of the pump impeller 12 and turbine runner 13 tends to generate a shock.

Referring to FIGS. 10A-10G, this phenomenon will be described further in detail. Before a time t1, the throttle is maintained at a constant opening as shown in FIG. 10A, and the output torque TQE of the engine 1 is also constant as shown in FIGS. 10B and 10C. The lockup clutch 2 gradually increases the engaging force under open loop control of the differential pressure ΔP as shown in FIG. 10D, and the real slip rotation speed Nslp between the pump impeller 12 and the turbine runner 13 decreases.

At the time t1 when the driver releases the accelerator pedal, the output torque TQE of the engine 14 decreases rapidly as shown in FIGS. 10B and 10C. Accordingly, at a time t2, the real slip rotation speed Nslp between the pump impeller 12 and the turbine runner 13 becomes lower than the open loop control termination slip rotation speed Nslp_end. Consequently, switch-over from open loop control of the differential pressure ΔP to feedback control thereof takes place. However, due to a time required until feedback control becomes effective, and the rotation speed of the engine 14 continues to decrease and finally the lockup clutch 2 is substantially in a lockup state. Thereafter, until when the lockup clutch 2 is operated again into a predetermined slip state under feedback control of the differential pressure ΔP, the pump impeller 12 and the turbine runner 13 are maintained in the engaged state and the rotation speed of the engine 14 tends to fluctuate as shown in FIGS. 10E and 10F. The fluctuation in the rotation speed of the engine 14 in this state is likely to exert a shock on the vehicle body.

This invention executes an open loop control subroutine shown in FIGS. 6A and 6B in the step S9. The subroutine has steps to prevent the above problem when the driver releases the accelerator pedal during increase operation of the engaging force of the lockup clutch 2 under open loop control of the differential pressure ΔP.

Before describing the subroutine, the outline of control intended by this invention will be described.

The basic technical concept of this invention is to decrease the differential pressure ΔP so as to prevent the lockup clutch 2 from locking up when the engine output torque is rapidly decreased during increase operation of engaging force of the lockup clutch 2 under open loop control.

There are several options to determine a rapid decrease in the engine output torque and decrease the differential pressure ΔP.

It is possible to determine the rapid decrease in the engine output torque from an engine output torque variation amount ΔTQE1 during a predetermined time period T1. The predetermined time period T1 is a value related to a response delay in the engine output torque TQE and a response delay in engaging force control of the lockup clutch 2. The predetermined time period T1 is previously determined to a value longer than these response delays which are determined through experiment. As a result, the amount ΔTQE1 takes a larger value as the response delay in engaging force control of the lockup clutch 2 becomes longer.

Referring to FIGS. 12A-12G, at a time t1 when the driver releases the accelerator pedal, the throttle opening shown in FIG. 2A rapidly decreases, and accordingly the engine output torque TQE rapidly decreases as shown in FIGS. 12B and 12C.

At a time t2, the engine output torque variation amount ΔTQE1 during the predetermined time period T1 exceeds a torque down determination reference value CUTDWN_JDG. Since the values of ΔTQE1 and CUTDWN_JDG are both negative values, the term "exceed" herein means that the absolute value of ΔTQE1 becomes greater than the absolute value of CUTDWN_JDG.

The torque down determination reference value CUTDWN_JDG is a reference value in order to determine if the engaging force of the lockup clutch 2 should be decreased rapidly in a stepwise fashion in accordance with the decrease in the engine output torque TQE. As long as the decrease in the engine output torque TQE is gradual, no trouble is anticipated in switching over between open loop control of the differential pressure ΔP to feedback control thereof. Therefore, the reference value CUTDWN_JDG is a value to determine if the decrease rate in the engine output torque TQE, which is represented as the engine output torque variation amount ΔTQE1 during the predetermined time period T1, is so large as to cause the lockup clutch 2 to be locked up before feedback control of the differential pressure ΔP becomes effective.

The difference between a transmitted torque of the torque converter 1 when open loop control terminates and a transmitted torque of the same when the lockup clutch 2 is substantially locked up is equivalent to a transmitted torque via fluid in the torque converter at the open loop control termination slip rotation speed Nslp_end. This transmitted torque is herein named an open loop control termination converter torque Tcnv_END.

If the decrease amount in the engine output torque TQE during the predetermined time period T1 from when open loop control is terminated until feedback control becomes effective does not exceed the open loop control termination converter torque Tcnv_END, open loop control of the differential pressure ΔP is smoothly switched over to feedback control thereof. The torque down determination reference value CUTDWN_JDG is therefore set equal to the open loop control termination converter torque Tcnv_END. It should be noted that the torque down determination reference value CUTDWN_JDG is a negative value.

When the engine output torque variation amount ΔTQE1 during the predetermined time period T1 exceeds the torque down determination reference value CUTDWN_JDG, or in other words when the absolute value of ΔTQE1 becomes greater than the absolute value of CUTDWN_JDG, the controller 5 decreases the transmittable torque TLU of the lockup clutch 2 at a predetermined decrease rate until a time t3 as shown in FIG. 12D. As a result, the transmittable torque TLU does not become greater than the engine output torque TQE, and the lockup clutch 2 is prevented from becoming locked up. It is therefore possible to avoid generation of a shock or vibration caused by the lockup clutch 2 which is locked up. It is also possible to determine a rapid decrease in the engine output torque directly from the engine output torque value instead of determining it from the engine output torque variation amount ΔTQE1.

After decreasing the transmittable torque TLU, the controller 5 resumes increase of the engaging force of the lockup clutch 2 under open loop control of the differential pressure ΔP for a decreased engine output torque TQE so as to shift from the converter mode to the lockup mode.

At a time t4, when the real slip rotation speed Nslp becomes lower than the open loop control termination slip rotation speed Nslp_end, the controller 5 shifts to feedback control of the differential pressure ΔP in the slip mode.

It should be noted that it is possible to decrease the transmittable torque TLU of the lockup clutch 2 for a predetermined amount in a stepwise fashion at the time t2 instead of decreasing it at a constant rate during a period between the time t2 and the time t3.

By thus decreasing the transmittable torque TLU of the lockup clutch 2 when the engine output torque variation amount ΔTQE1 during the predetermined time period T1 exceeds the torque down determination reference value CUTDWN_JDG, lockup of the lockup clutch 2 under open loop control of the differential pressure ΔP is prevented, thereby assuring a smooth operation of the lockup clutch 2 from the converter mode to the lockup mode via the slip mode.

In contrast, according to a prior art device which does not prevent the lockup clutch 2 from locking up during open loop control of the differential pressure ΔP, the lockup clutch 2 locks up at an early stage during open loop control of the differential pressure ΔP as shown by the dotted line in FIGS. 12E-12G when the throttle opening rapidly decreases. As a result, the pump impeller 12 and the turbine runner 13 become locked up and the rotation speed tends to fluctuate, which may generate a shock to the vehicle body.

Referring to FIGS. 13A-13G, at a time point where the real slip rotation speed Nslp becomes equal to the open loop control termination slip rotation speed Nslp_end, or in other words at a time point where the dotted line and the broken line start to overlap in FIG. 13G, the engine output torque TQE becomes equal to the sum of the transmittable torque TLU and the open loop control termination converter torque Tcnv_END as shown in FIG. 13C.

At any arbitrary time point preceding this time point, increase operation of the engaging force of the lockup clutch 2 under open loop control of the differential pressure ΔP is performed. If the engine output torque TQE drops to a value TLU_END corresponding to the sum of the transmittable torque TLU and the open loop control termination converter torque Tcnv_END, the real slip rotation speed Nslp then becomes equal to the open loop control termination slip rotation speed Nslp_end, and hence open loop control of the differential pressure ΔP is terminated and feedback control thereof is started. The value TLU_END in FIG. 13C therefore denotes an engine output torque at which open loop control is terminated.

When the driver releases the accelerator pedal during open loop control of the differential pressure ΔP, the engine output torque TQE rapidly decreases, and the engine rotation speed continues to decrease even after the real slip rotation speed Nslp becomes equal to the open loop control termination slip rotation speed Nslp_end. At a time point where the real slip rotation speed Nslp becomes equal to the open loop control termination slip rotation speed Nslp_end, feedback control of the differential pressure ΔP is started, but until feedback control becomes effective, due to a decreased engine rotation speed, the lockup clutch 2 is locked up, and the rotation speed of the pump impeller 13, or the rotation speed of the engine 1, tends to fluctuate. Shifting from open control of the differential pressure ΔP to feedback control thereof may therefore not be smooth in this situation.

To cope with the above situation, it is considered to determine the rapid decrease in the engine output torque by determining if the engine output torque TQE has entered a potentially hazardous area for sudden engagement of the lockup clutch 2.

The potentially hazardous area for sudden engagement is represented by its upper limiting value TLU_SOS which corresponds to a maximum transmittable torque at which the lockup clutch 2 may suddenly be locked up when the engine output torque TQE rapidly decreases. The upper limiting value TLU_SOS of the potentially hazardous area for sudden engagement can be calculated by the following equation (2).

$$TLU\_SOS = TLU\_END + |\Delta TQE1| \quad (2)$$

where, TLU_END=open loop control termination converter torque, and
ΔTQE1=engine output torque variation amount during the predetermined time period T1.

Herein, |ΔTQE1| represents a decrease amount of the engine output torque TQE during a response delay period of the lockup clutch 2.

During open loop control of the differential pressure ΔP, when the engine output torque TQE falls below the upper limiting value TLU_SOS of the potentially hazardous area for sudden engagement, it means that the lockup clutch 2 may be locked up within the predetermined time period T1. In order to prevent the lockup clutch 2 from becoming locked up, at the time point where the engine output torque TQE has become equal to the upper limiting value TLU_SOS of the potentially hazardous area for sudden engagement, in other words at the time t2 in FIGS. 13A-13G, it is preferable to immediately decrease the engine output torque TQE in a stepwise fashion as shown in FIG. 13D and then resume the increase operation of the engaging force of the lockup clutch under open loop control of the differential pressure ΔP. Another possibility is to decrease the engine output torque TQE at a large rate as shown in FIG. 12D.

The basic control concept of this invention to prevent a sudden lockup of the lockup clutch 2 when the engine output torque TQE has rapidly decreased due to rapid decrease of the throttle opening while the engaging force of the lockup clutch 2 is increased under open loop control of the differential pressure ΔP, is described as above.

Next, referring to FIGS. 6A and 6B, the subroutine which is based on the above control concept and executed by the controller 5 in the step S9 in FIG. 2 will be described. According to the configuration of the routine of FIG. 2, this subroutine is executed every time when the operation of the lockup clutch 2 shifts from the converter mode to the slip mode or lockup mode.

In a first step S50, the controller 5 reads the engine output torque TQE of the internal combustion engine 14. The engine output torque TQE can be obtained from the engine rotation speed and the throttle opening by referring to an engine torque map predefined through experiment and previously stored in the ROM. The engine rotation speed is equal to the rotation speed of the pump impeller 12.

In a next step S51, the controller 5 calculates an engine output torque variation amount $\Delta TQE1$ during the predetermined time period T1. The predetermined time period T1 is a value depending upon response delays in the engine output torque TQE and in engaging force control of the lockup clutch 2 and is predetermined through experiment such that the predetermined time period T1 is longer than any of these delays. In other words, the engine output torque variation amount $\Delta TQE1$ is a decrease amount of the engine torque TQE during the predetermined time period T1 which represents a response delay time period in engaging force control of the lockup clutch 2. The engine output torque variation amount $\Delta TQE1$ therefore takes a larger value as the response delay time period in engaging force control of the lockup clutch 2 increases.

In a next step S52, the controller 5 calculates a variation amount $\Delta TQE2$ of the engine output torque TQE since the last occasion when the subroutine was executed.

Figure 7:
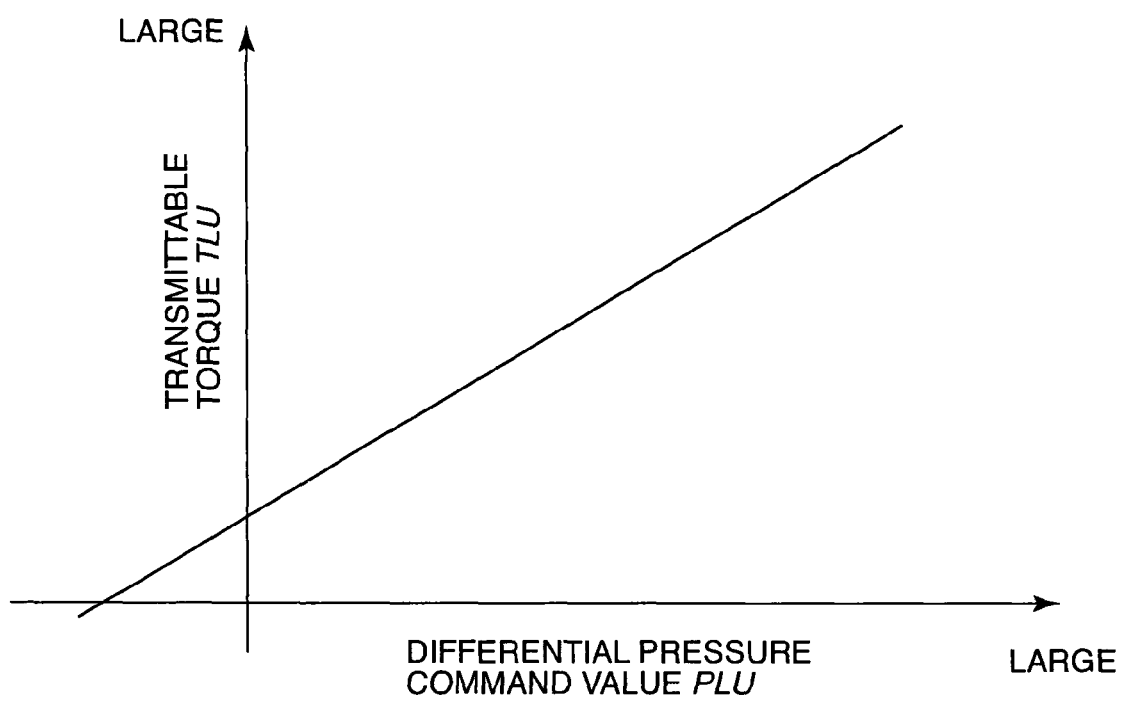
FIG. 7 is a diagram showing the characteristics of a map stored by the controller defining the relation between a differential pressure and a transmittable torque of the lockup clutch.

In a next step S53, the controller 5 determines a transmittable torque TLU_z of the lockup clutch 2 corresponding to a differential pressure command value PLU_z that was output on the preceding occasion when the subroutine was executed by referring to a map previously stored in the ROM. The characteristics of the map are shown in FIG. 7.

In a next step S54, the controller 5 determines the open loop control termination slip rotation speed Nslp_end from the throttle opening of the internal combustion engine 14 by referring to a map previously stored in the ROM of the controller 5. The characteristics of the map are shown in FIG. 5.

In a next step S55, the controller 5 calculates a converter torque Tcnv_END at the open loop control termination slip rotation speed Nslp_end. The converter torque Tcnv_END is a torque transmitted via fluid in the torque converter 1. The converter torque Tcnv_END is calculated using the following equation (3) which is disclosed in the aforesaid Japanese Patent Serial No. 3183235 teaching feedback control of the differential pressure in the slip mode.

$$Tcnv\_END = Nslp\_end / gSLP \quad (3)$$

where, gSLP=slip rotation gain.

Figure 8:
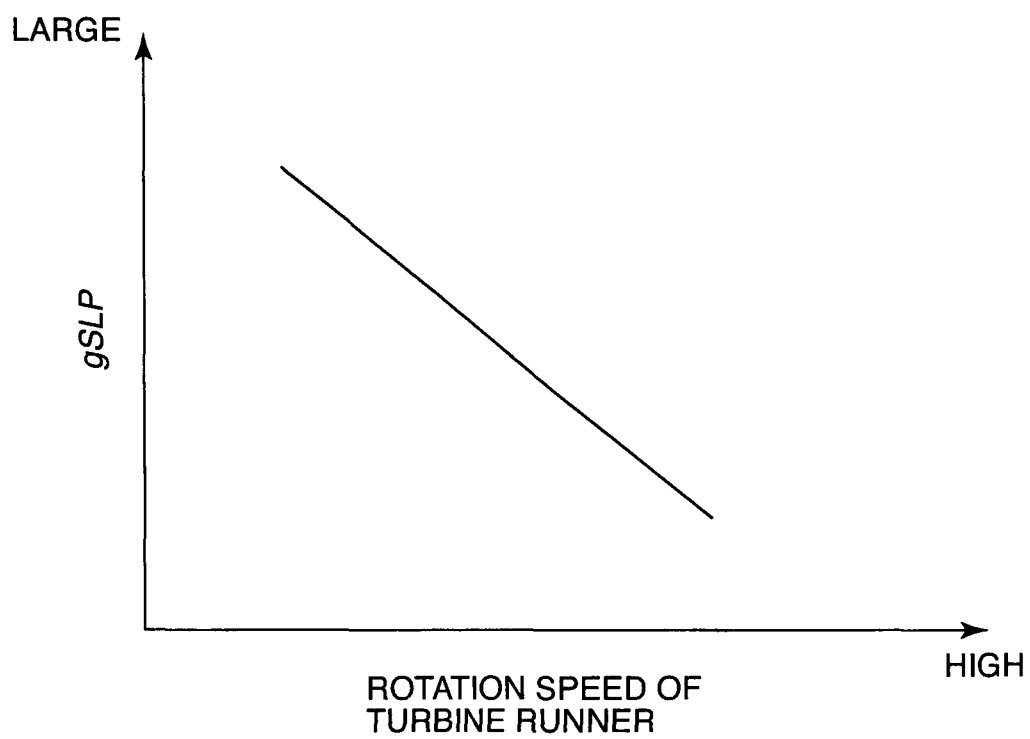
FIG. 8 is a diagram showing the characteristics of a map stored by the controller defining the relation between a rotation speed of a turbine runner and a slip rotation gain gSLP.

The slip rotation gain gSLP is obtained from the rotation speed of the turbine runner 13 by referring to a map previously stored in the ROM of the controller 5, of which the characteristics are shown in FIG. 8.

In a next step S56, the controller 5 determines the upper limiting value TLU_SOS of the potentially hazardous area for sudden engagement, using the equation (2) described above.

For this determination, the controller 5 calculates the open loop control termination converter torque TLU_END using the following equation (4).

$$TLU\_END = TLU\_z + Tcnv\_END \quad (4)$$

where, TLU_z=transmittable torque of the lockup clutch 2 on the preceding occasion when the subroutine was executed.

In a next step S57, the controller 5 sets the torque down determination reference value CUTDWN_JDG at a value equal to the converter torque Tcnv_END.

In order to increase the precision of torque down determination, the torque down determination reference value CUTDWN_JDG is preferably limited by an upper limiting value CDJDG_MAX and a lower limiting value CDJDG_MIN using the following equation (5).

$$CUTDWN\_JDG = MAX(CDJDG\_MIN, MIN(Tcnv\_END, CDJDG\_MAX)) \quad (5)$$

Since the torque down determination reference value CUTDWN_JDG is a negative value, the upper limiting value CDJDG_MAX and the lower limiting value CDJDG_MIN are also negative values.

In a next step S58, the controller calculates a rapid decrease amount TLU_CUTDWN of transmittable torque of the lockup clutch 2. The initial value of TLU_CUTDWN is given by the following equation (6).

$$TLU\_CUTDWN = |\Delta TQE1| + Tcnv\_END \quad (6)$$

When TLU_CUTDWN is calculated on the second or later occasion due to repetition of the execution of the subroutine, the following equation (7) is applied instead of the equation (6).

$$TLU\_CUTDWN = |\Delta TQE1| \quad (7)$$

After determining various values in the steps S50-S58 as described above, the controller 5 determines in a step S59 if the engine output torque TQE is in the potentially hazardous area for sudden engagement of the lockup clutch 2 by a determination as to whether or not the following relation (8) holds.

$$TQE < TLU\_SOS \quad (8)$$

If the engine output torque TQE is in the potentially hazardous area for sudden engagement of the lockup clutch 2, the controller 5 determines in a step S60 if the transmittable torque of the lockup clutch 2 needs to be decreased by a determination as to whether or not the following relation (9) holds.

$$\Delta TQE1 < CUTDWN\_JDG \quad (9)$$

When the relation (9) holds, the controller 6 rapidly decreases the transmittable torque TLU of the lockup clutch 2 in a step S61 by applying the following equation (10) based on the rapid decrease amount TLU_CUTDWN of transmittable torque of the lockup clutch 2.

$$TLU = TLU\_z - TLU\_CUTDWN \quad (10)$$

In a next step S62, the controller sets a torque down timer value TLUCDtmr at a predetermined time period T2. The torque down timer value TLUCDtmr is set for the purpose of maintaining the transmittable torque TLU of the lockup clutch 2 for the predetermined time period T2 after it is rapidly decreased, considering a response delay time period of the engaging force of the lockup clutch 2 with respect to the differential pressure command value. The initial value of the torque down timer value TLUCDtmr is zero. The value of the predetermined time period T2 is previously determined to a value longer than the response delay time period of the engaging force of the lockup clutch 2 with respect to the differential pressure command value which is determined through experiment.

After the processing of the step S62, the controller executes the processing of a step S68, When on the other hand the relation (9) does not hold in the step S60, the controller 5 determines in a step S63 if the torque down timer value TLUCDtmr is equal to zero.

When the torque down timer value TLUCDtmr is equal to zero, the controller 5 determines in a step S64 if the variation amount ΔTQE2 of the engine output torque TQE since the last occasion when the subroutine was executed is smaller than zero, or in other words if the engine output torque TQE is decreasing.

When the determination in the step S64 is affirmative, the controller 5 decreases the transmittable torque TLU of the lockup clutch 2 in a step 65 by a value corresponding to the variation amount ΔTQE2 of the engine output torque TQE since the last occasion when the subroutine was executed using the following equation (11).

$$TLU=TLU\_z+\Delta TQE2 \qquad (11)$$

When the determination in the step S64 is negative, the controller 5 executes the processing of a step S67.

When on the other hand the torque down timer value TLUCDtmr is not equal to zero in the step S63, the controller 5 decrements the torque down timer value TLUCDtmr in a step S66. After the processing of the step S66, the controller executes the processing of the step S67.

In the step S67, the controller 5 maintains the transmittable torque TLU of the lockup clutch 2 equal to the previous value TLU_z as expressed by the following equation (12).

$$TLU=TLU\_z \qquad (12)$$

In the step S59, if the engine output torque TQE is not in the potentially hazardous area for sudden engagement of the lockup clutch 2, or in other words the relation (8) does not hold, the controller 6 executes the processing of a step S69 and subsequent steps.

In the step S69, the controller 5 determines if the torque down timer value TLUCDtmr is equal to zero. When the torque down timer value TLUCDtmr is equal to zero, the controller 5 sets a differential pressure command value for open loop control during normal condition.

Figure 9:
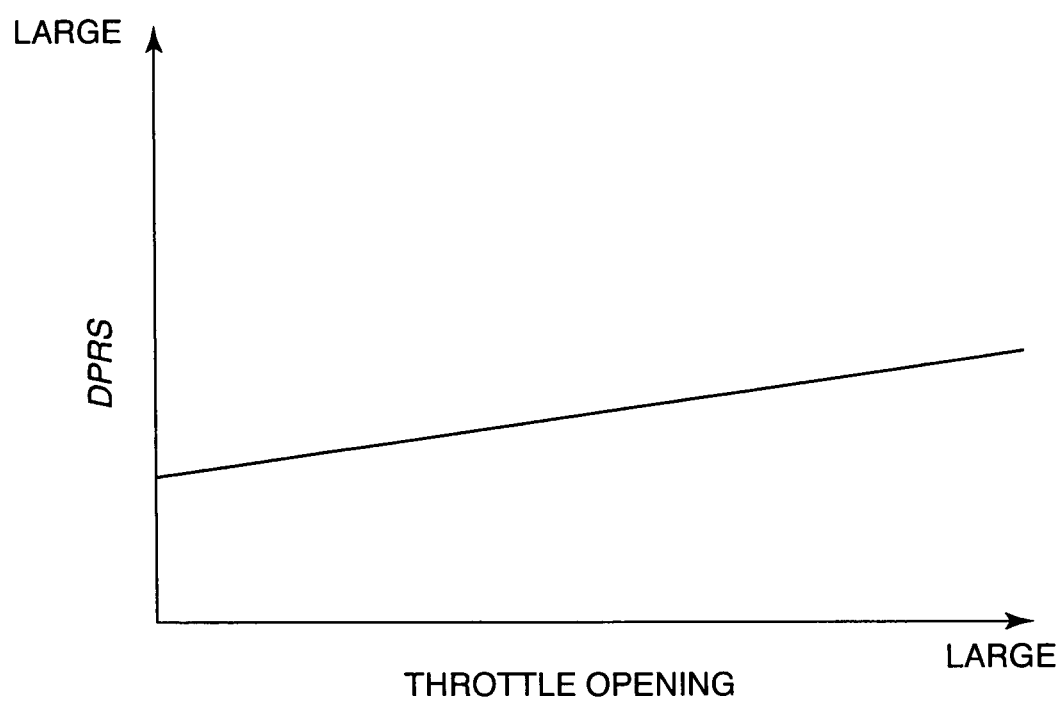
FIG. 9 is a diagram showing the characteristics of a map stored by the controller defining the relation between the throttle opening and a differential pressure increases amount DPRS per unit time.

Specifically, the controller 5 first determines a differential pressure increases amount DPRS per unit time from the throttle opening by referring to a map previously stored in the ROM, of which the characteristics are shown in FIG. 9. Herein, the unit time is equal to the intervals of the routine execution, i.e., twenty milliseconds. The controller 5 then calculates the differential pressure command value for open loop control during normal condition Pluc using the following equation (13).

$$Pluc=PLU\_z+DPRS \qquad (13)$$

where, PLU_z=differential pressure command value on the preceding occasion when the routine was executed.

In the step S69, when the torque down timer value TLUCDtmr is not equal to zero, the controller 5, in a step S71, maintains the transmittable torque TLU of the lockup clutch 2 equal to the previous value TLU_z as expressed by the aforesaid equation (12). In a next step S72, the controller 5 decrements the torque down timer value TLUCDtmr.

After the processing of the steps S62, S65, S67, S70 or S72, the controller executes the processing of the step S68.

In the step S68, the controller 5 obtains the differential pressure command value PLU from the determined transmittable torque TLU of the lockup clutch 2 by referring to the map in the ROM corresponding to FIG. 7, and outputs a command signal corresponding to the differential pressure command value PLU to the lockup solenoid 4.

When the processing of the step S68 is performed after the execution of the processing of the step S70, the controller sets the differential pressure command value PLU equal to the value Pluc determined in the step S70, and outputs a command signal corresponding to the differential pressure command value PLU to the lockup solenoid 4.

After the processing of the step S68, the controller 5 terminates the subroutine.

Referring again to FIGS. 13A-13G. as a result of execution of the above routine and subroutine, when the engine output torque TQE is determined to have exceeded the upper limiting value TLU_SOS of the potentially hazardous area for sudden engagement in the step S59 at the time t2 during open loop control of the differential pressure ΔP, the controller 5 rapidly decreases the transmittable torque TLU of the lockup clutch 2 in the steps S61-S65. Hence, as shown in FIGS. 13C and 13D, the engine output torque TQE does not become lower than the transmittable torque TLU, the rotation speed of the pump impeller 13 that is equal to the engine rotation speed is maintained higher than the rotation speed of the turbine runner 12. The lockup clutch 2 is therefore maintained in the converter mode and a shock or vibration due to sudden engagement of the lockup clutch 2 can be prevented.

The controller 5 thus prevents a sudden engagement of the lockup clutch 2 while continuing open loop control of the differential pressure ΔP until the time t3 at which the real slip rotation speed Nslp equals the open loop control termination slip rotation speed Nslp_end. After the time t3, the controller 5 shifts control of the differential pressure ΔP from open loop control to feedback control.

According to the prior art device which does not perform prevention processing of sudden engagement of the lockup clutch 2 during open loop control of the differential pressure ΔP, fluctuations in the rotation speed of the engine or that of the transmission are not absorbed by a slip between the pump impeller 12 and the turbine runner 13 after a sudden engagement of the lockup clutch 2, and tend generate a shock as already expressed with reference to FIGS. 10A-10G.

With respect to prevention of sudden engagement of the lockup clutch 2 during open loop control of the differential pressure ΔP, a known method is to release the lockup clutch when the throttle opening is rapidly decreased as shown in FIGS. 11A-11G.

Specifically, at the time t1 when the driver releases the accelerator pedal, the throttle opening rapidly decreases as shown in FIG. 11A, and the engine output torque rapidly decreases as shown in FIG. 11B accordingly. By detecting a rapid decrease in the throttle opening, the lockup clutch is released at a time t2 as shown in FIG. 11C and the torque converter returns to a complete converter mode.

The rapid release of the lockup clutch tends to generate a shock as well as to cause the engine rotation speed to rapidly increase as shown in FIG. 11D. Accordingly, the slip rotation speed Nslp also rapidly increases in the complete converter mode as shown in FIG. 11F.

Since open loop control of the differential pressure ΔP is resumed from this state as in the case of the period before the time t1, it takes a long time until the operation of the lockup clutch 2 shifts to the slip mode, and hence fuel consumption by the engine is inevitably increased due to this operation. Further, when the determination as to whether or not the lockup clutch is to be released is performed based only on the throttle opening, it is difficult to obtain a high precision of determination and there is a possibility that the lockup clutch is released unintentionally. This invention has therefore an advantage in prevention of a shock as well as suppression of fuel consumption over the prior art device which is configured to release the lockup clutch in response to a rapid decrease in the throttle opening.

Next, referring to FIGS. 14A-14G, FIGS. 17A-17G, FIGS. 18A-18G, FIGS. 19A-19D, and FIGS. 20A-20D, the results of execution of the engaging force control routine by the controller 5 will be described.

The subroutine of FIGS. 6A and 6B executed by the controller 5 for open control of the differential pressure ΔP is based on the concepts as explained with reference to FIGS. 12A-12G and FIGS. 13A-13G. However, in the subroutine, further control is performed with respect to the determination of rapid decrease in the engine output torque TQE and the determination of the transmittable torque TLU. The results of such control will be hereinafter explained with respect to various cases in detail.

FIGS. 14A-14G correspond to a case where the engine output torque TQE falls below the upper limiting value TLU_SOS of the potentially hazardous area for sudden engagement while the engine output torque variation amount ΔTQE1 during the predetermined period T1 is small.

When the driver releases the accelerator pedal at a time t1, the throttle opening rapidly decreases as shown in FIG. 14A, and the engine output torque TQE decreases with a delay as shown in FIGS. 14B and 14C. On the other hand, the upper limiting value TLU_SOS of the potentially hazardous area for sudden engagement is increasing according to increase in the differential pressure ΔP under open loop control as shown in FIG. 14D.

At a time t2, when the engine output torque TQE falls below the upper limiting value TLU_SOS of the potentially hazardous area for sudden engagement, the determination in the step S59 becomes affirmative. However, since the engine output torque variation amount ΔTQE1 during the predetermined period T1 does not exceed the torque down determination reference value CUTDWN_JDG, the determination in the step S60 continues to be negative. The rapid decrease in the transmittable torque TLU is therefore not performed and the torque down timer value TLUCDtmr is maintained at the initial value of zero.

Accordingly, the determination in the step S63 is affirmative, and the controller 5 gradually decreases the transmittable torque TLU every time the routine is executed by a decrement equal to ΔTQE2 based on the aforesaid equation (11) in the steps S64 and S65

At a time t3, the engine output torque TQE becomes larger than the upper limiting value TLU_SOS of the potentially hazardous area for sudden engagement, and the determination in the step S59 changes to negative. Since the torque down timer value TLUCDtmr is maintained at zero, the controller 5 terminates the decrease processing of the transmittable torque TLU and resumes increase processing of the differential pressure ΔP under open loop control in the step S70.

Figure 2:
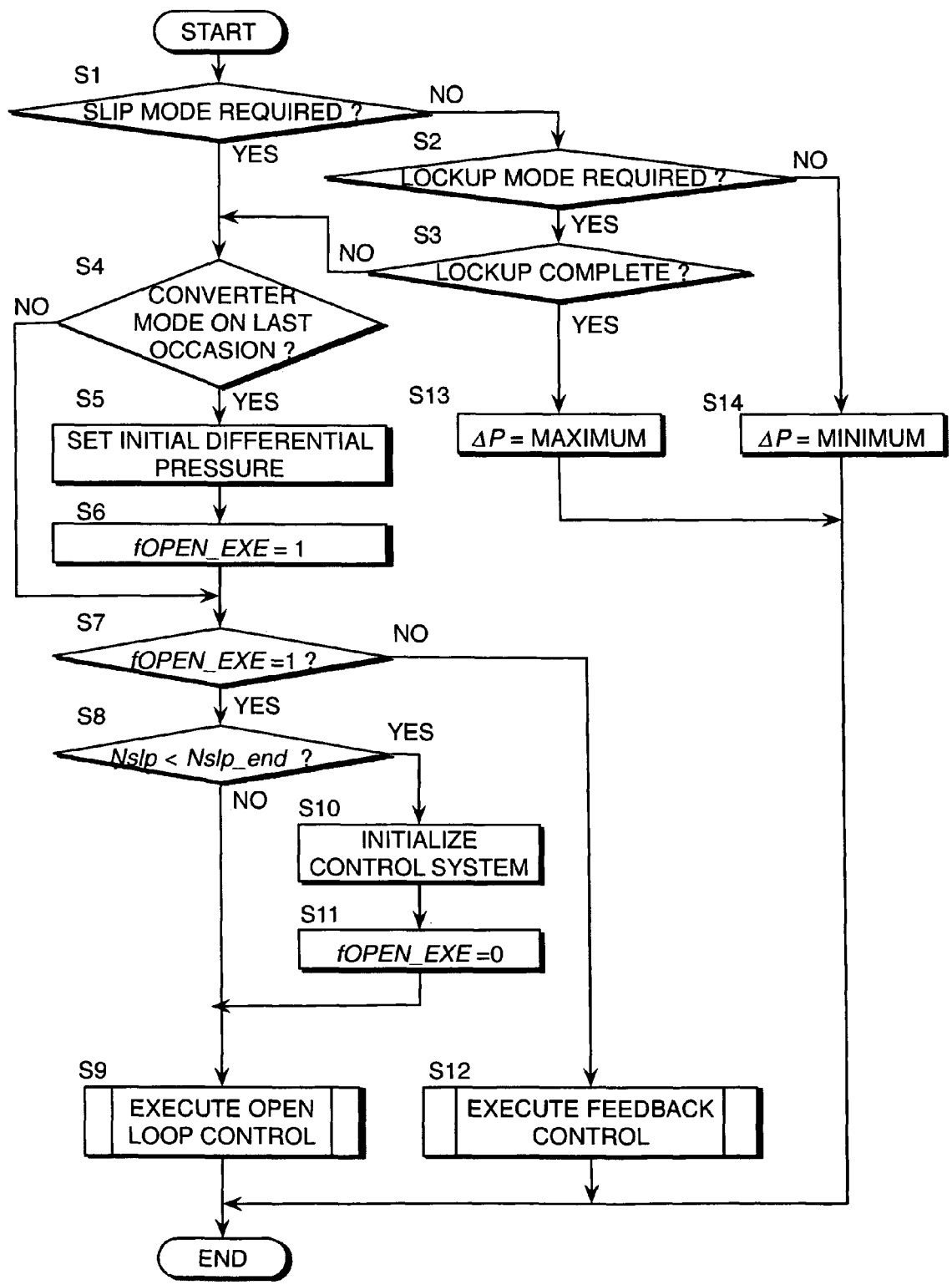
FIG. 2 is a flowchart for describing an engaging force control routine executed by a controller according to this invention.

At a time t4, the real slip rotation speed Nslp becomes lower than the open loop control termination slip rotation speed Nslp_end in the step S8 in the routine of FIG. 2, the controller 5 terminates open loop control of the differential pressure ΔP and starts feedback control thereof in the slip mode in the step S12.

FIGS. 17A-17G correspond to a case where the engine output torque TQE falls below the upper limiting value TLU_SOS of the potentially hazardous area for sudden engagement, and the engine output torque variation amount ΔTQE1 during the predetermined period T1 is large.

At a time t2, when the engine output torque variation amount ΔTQE1 during the predetermined period T1 exceeds the torque down determination reference value CUTDWN_JDG, but since the engine output torque TQE is still greater than the upper limiting value TLU_SOS of the potentially hazardous area for sudden engagement, the determination in the step S59 is negative. In this case, the rapid decrease processing of the transmittable torque TLU is not performed and the torque down timer value TLUCDtmr is maintained at the initial value of zero.

At a time t3, the engine output torque TQE falls below the upper limiting value TLU_SOS of the potentially hazardous area for sudden engagement, and hence both the determinations in the steps S59 and S60 become affirmative.

The controller 5 then rapidly decreases the transmittable torque TLU of the lockup clutch 2 in a stepwise fashion using the rapid decrease amount TLU_CUTDWN calculated in the step S61 using the equation (6). The controller 5 then sets the torque down timer value TLUCDtmr to the predetermined time period T2 in the step S62.

As a result, as shown in FIGS. 17C and 17D, the transmittable torque TLU rapidly decreases, and accordingly the upper limiting value TLU_SOS of the potentially hazardous area for sudden engagement shows a rapid decrease to a value smaller than the engine output torque TQE.

Consequently, when the routine is next performed, the determination in the step S59 changes to negative. The controller 5 then maintains the transmittable torque TLU in the step S69 at the value TLU_z which is the value of TLU commanded on the preceding occasion when the routine was performed. The transmittable torque TLU is maintained at TLU_z until the torque down timer value TLUCDtmr becomes zero.

According to the above processing, since the transmittable torque TLU of the lockup clutch 2 does not become greater than the engine output torque TQE, the lockup clutch 2 is prevented from an unintentional engagement, and generation of an unfavorable shock or vibration is thereby suppressed.

At a time t4, when the torque down timer value TLUCDtmr becomes zero, in other words when the predetermined time period T2 has elapsed, the controller resumes open loop control of the differential pressure ΔP, in other words it resumes the increase operation of the differential pressure ΔP using the equation (13).

Open loop control of the differential pressure ΔP is continued until a time t5 at which the relation (1) holds and control of the differential pressure ΔP is shifted to feedback control in the slip mode.

As described above, during the time period from the time t2 when the transmittable torque TLU is rapidly decreased until the time t4, which is equivalent to the predetermined time period T2, the decreased transmittable torque is maintained, and hence a response delay in the real engaging force of the lockup clutch 2 with respect to the command value is compensated for in this time period. By providing such a maintaining period T2, therefore, rapid decrease in the transmittable torque TLU is ensured, the slip rotation speed Nslp is prevented from dropping, and suppression of a shock or vibration is thereby ensured.

FIGS. 18A-18G correspond to a case where the decrease in the engine output torque TQE is greater than in the case of FIGS. 17A-17G.

The processing before the time t3 is identical to the processing executed in the case of FIGS. 17A-17G. After the time t3 when the transmittable torque TLU is rapidly decreased, the controller 5 maintains TLU at the decreased value. In this case, however, since the decrease in the engine output torque TQE is great, it again falls below the upper limiting value TLU_SOS of the potentially hazardous area for sudden engagement at a time t4 as shown in FIGS. 18C and 18D, and the determination in the step S59 changes again to be affirmative.

The controller 5 then rapidly decreases again the transmittable torque TLU in the step S61. Since it is a second occasion of rapid decrease in the transmittable torque TLU using the rapid decrease amount TLU_CUTDWN during the same shifting process from open loop control to feedback control, the value of the rapid decrease amount TLU_CUTDWN used on this occasion is the value calculated by the equation (7) which is equal to |ΔTQE1| and smaller than the value of TLU_CUTDWN applied on the first occasion when the processing of the step S61 was executed.

By performing the processing of rapid decrease in the transmittable torque TLU for the second time at the time t4 as shown in FIG. 18D, the upper limiting value TLU_SOS of the potentially hazardous area for sudden engagement drops again and becomes smaller than the engine output torque TQE Thereafter, the controller maintains the transmittable torque TLU at the decreased value for the predetermined time period T2. At a time t5, the controller 5 resumes normal open loop control of the differential pressure ΔP in the step S70, and at a time t6, the controller 5 shifts control of the differential pressure ΔP to feedback control in the slip mode.

As described above, if the engine output torque TQE falls below the upper limiting value TLU_SOS of the potentially hazardous area for sudden engagement during the maintenance period T2 of the decreased transmittable torque TLU, the controller 5 performs again the rapid decrease processing of the transmittable torque TLU, thereby ensuring prevention of an unintentional engagement of the lockup clutch 2.

FIGS. 19A-19D correspond to a case where the absolute value of the torque down determination reference value CUTDWN_JDG is smaller than that of the upper limiting value CDJDG_MAX. Since the values CUTDWN_JDG and CDJDG_MAX are negative values, it means that CUTDWN_JDG is located above the potentially hazardous area for sudden engagement of the lockup clutch 2 in FIG. 19D. Herein, the absolute value of the torque down determination reference value CUTDWN_JDG which is set equal to the open loop control termination converter torque Tcnv_END is smaller than that of the upper limiting value CDJDG_MAX.

At a time t1 when the driver releases the accelerator pedal, the throttle opening decreases rapidly and the engine output torque TQE drops rapidly. At a time t2, the engine output torque TQE becomes smaller than the rapid decrease amount TLU_CUTDWN of transmittable torque of the lockup clutch 2. Since the engine output torque variation amount ΔTQE1 during the predetermined period T1 does not exceed the torque down determination reference value CUTDWN_JDG at this time point, the controller 5 does not execute the rapid decrease processing of the transmittable torque TLU, but decreases the transmittable torque TLU in the step S65 using a decreased amount equivalent to the variation amount ΔTQE2 of the engine output torque TQE since the last occasion when the subroutine was executed.

At a time t3, however, the engine output torque variation amount ΔTQE1 during the predetermined period T1 does exceed the torque down determination reference value CUTDWN_JDG. The controller 5 then rapidly decreases the transmittable torque TLU in the step S61. After this processing, the controller 5 maintains the transmittable torque TLU at the decreased value for the time period T2 in the steps S69-S72, and at a time t4, resumes in the step S70 increase operation of the engaging force of the lockup clutch 2 under open loop control of the differential pressure ΔP based on the equation (13).

When the open loop control termination converter torque Tcnv_END is set at a small value, the absolute value of the torque down determination reference value CUTDWN_JDG is also small. Herein, the torque down determination reference value CUTDWN_JDG is a negative value, and hence CUTDWN_JDG shifts upward in FIG. 19D as the absolute value becomes smaller. As a result, rapid decrease processing of the transmittable torque TLU in the step 61 is frequently performed, and shifting to feedback control may not be realized within an expected time period.

However, since the torque down determination reference value CUTDWN_JDG is limited by an upper limiting value CDJDG_MAX in the step S57 using the equation (6), when the engine output torque variation amount ΔTQE1 during the predetermined period T1 exceeds −Tcnv_END, the rapid decrease processing of the transmittable torque TLU is not executed immediately. Rapid decrease processing of the transmittable torque TLU is only performed at the time t3 when the absolute value of the engine output torque variation amount ΔTQE1 during the predetermined period T1 exceeds CDJDG_MAX.

By thus limiting the torque down determination reference value CUTDWN_JDG by the upper limiting value CDJDG_MAX, frequent execution of the rapid decrease processing of the transmittable torque TLU is avoided.

FIGS. 20A-20D correspond to a case where the absolute value of the torque down determination reference value CUTDWN_JDG which is set equal to Tcnv_END is greater than that of the lower limiting value CUTDWN_JDG. Herein the processing executed by the controller 5 is the same as that executed in the case of FIGS. 19A-19D.

Specifically, at the time t2, the engine output torque TQE falls below the upper limiting value TLU_SOS of the potentially hazardous area for sudden engagement. However, since the engine output torque variation amount ΔTQE1 during the predetermined period T1 does not exceed the torque down determination reference value CUTDWN_JDG at this time point, the controller 5 does not execute the rapid decrease processing of the transmittable torque TLU, but decreases the transmittable torque TLU in the step S65 using a decrease amount equivalent to the variation amount ΔTQE2 of the engine output torque TQE since the last occasion when the subroutine was executed.

At a time t3, the engine output torque variation amount ΔTQE1 during the predetermined period T1 exceeds the torque down determination reference value CUTDWN_JDG which is set equal to the lower limiting value CDJDG_MIN in the step S57.

The controller 5 then executes the rapid decrease processing of the transmittable torque TLU in the step S61 and thereafter maintains the transmittable torque TLU at the decreased value during the predetermined time period T2 in the steps S69-S72. When the predetermined time period T2 has elapsed at a time t4, the controller 5 resumes in the step S70 increase operation of the engaging force of the lockup clutch 2 under open loop control of the differential pressure ΔP based on the equation (13).

In this case, however, since the open loop control termination converter torque Tcnv_END is large and accordingly the absolute value of the torque down determination reference value CUTDWN_JDG which is set equal to Tcnv_END takes a value that exceeds the lower limiting value CDJDG_MIN as shown in FIG. 20D. If the torque down determination reference value CUTDWN_JDG was applied without limitation in the determination in the step S60, the rapid decrease processing of the transmittable torque TLU in the step S61 would not be executed and a sudden engagement of the lockup clutch 2 may occur.

According to the engaging force control routine of FIG. 2, however, the controller 5 limits the value of the torque down determination reference value CUTDWN_JDG to the lower limiting value CDJDG_MIN, and hence at the time t3, the engine output torque variation amount ΔTQE1 during the predetermined period T1 exceeds the torque down determination reference value CUTDWN_JDG and the controller 5 executes the rapid decrease processing of the transmittable torque TLU in the step S61.

As described with respect to the cases of FIGS. 19A-19D and FIGS. 20A-20D, according this engaging force control routine, a moderation processing is applied to the torque down determination reference value CUTDWN_JDG in the step S57. The moderation processing reduces the situations in which the rapid decrease processing of the transmittable torque TLU is frequently executed or in which the rapid decrease processing of the transmittable torque TLU is not executed at all. Therefore, a delay in shifting from open loop control of the differential pressure ΔP to feedback control thereof and an unintentional engagement of the lockup clutch 2 are both prevented through execution of this engaging force control routine.

Next, referring to FIGS. 15A-15G and FIGS. 16A-16G, variations of the engaging force control routine according to this invention will be described.

In the open loop control subroutine of FIGS. 6A and 6B, the steps S69, S71 and S72 may be omitted. These steps relate to a processing of maintaining the transmittable torque TLU at the decreased value after executing the rapid decrease processing of the transmittable torque TLU in the step S61.

FIGS. 15A-15G and FIGS. 16A-16G show control results when these steps are omitted from the open loop control subroutine of FIGS. 6A and 6B.

FIGS. 15A-15G correspond to a case where the above steps are omitted and the processing in the step S58 is modified to set the rapid decrease amount TLU_CUTDWN of transmittable torque of the lockup clutch 2 equal to the value |ΔTQE1| which is calculated using the equation (7).

During a period when the increase operation of the engaging force of the lockup clutch 2 is performed under open loop control of the differential pressure ΔP, the driver releases the accelerator pedal at a time t1, and the throttle opening decreases immediately as shown in FIG. 15A. The engine output torque TQE accordingly decreases with some delay as shown in FIG. 15C. On the other hand, as the differential pressure ΔP increases, the upper limiting value TLU_SOS of the potentially hazardous area for sudden engagement also increases as shown in FIG. 15D.

In this situation, at a time t2, the engine output torque variation amount ΔTQE1 during the predetermined period T1 exceeds the torque down determination reference value CUTDWN_JDG as shown in FIG. 15B. At this time point, however, the engine output torque TQE is not smaller than the upper limiting value TLU_SOS of the potentially hazardous area for sudden engagement, the determination in the step S59 in the subroutine of FIGS. 6A and 6B is negative and the rapid decrease processing of the transmittable torque TLU is not executed.

At a time t3, when engine output torque TQE becomes smaller than the torque down determination reference value CUTDWN_JDG, the controller 5 executes the rapid decrease processing of the transmittable torque TLU in the step S61 using the rapid decrease amount TLU_CUTDWN of transmittable torque of the lockup clutch 2 which is set equal to |ΔTQE1| and decreases the transmittable torque TLU in a stepwise fashion.

In accordance with the decrease of the transmittable torque TLU, the upper limiting value TLU_SOS of the potentially hazardous area for sudden engagement also decreases by the same amount, and the engine output torque TQE again becomes larger than the upper limiting value TLU_SOS. On the next occasion when the routine is executed, therefore, the determination in the step S59 again changes to negative, and the controller 5 resumes increase processing of the differential pressure ΔP under open loop control in the step S70 for a period of time.

At a time t4, however, the engine output torque TQE again falls below the upper limiting value TLU_SOS of the potentially hazardous area for sudden engagement, and both of the determinations in the step S59 and S60 become affirmative. The controller 5 then executes again the rapid decrease processing of the transmittable torque TLU in the step S61 using the rapid decrease amount TLU_CUTDWN of transmittable torque of the lockup clutch 2 which is again set equal to |ΔTQE1| and decreases the transmittable torque TLU in a stepwise fashion.

Thereafter, the engine output torque TQE does not fall below the upper limiting value TLU_SOS of the potentially hazardous area for sudden engagement, and increase processing of the differential pressure ΔP under open loop control in the step S70 is repeatedly performed until a time t5.

At the time t5, the real slip rotation speed Nslp becomes equal to the open loop control termination slip rotation speed Nslp_end in the step S8, the controller 5 starts to apply feedback control to control of the differential pressure ΔP in the step S12.

FIGS. 16A-16G only differs form FIGS. 15A-15g with respect to the value of the rapid decrease amount TLU_CUTDWN of transmittable torque of the lockup clutch 2. Herein, the initial value of TLU_CUTDWN is set using the equation (6) while on the second or later occasion when it is used, the equation (7) is applied for the calculation of TLU_CUTDWN. Accordingly, the initial value of TLU_CUTDWN is |ΔTQE1|+Tcnv_END and the value of TLU_CUTDWN for the second or later application is |ΔTQE1|.

The processing by the time t3 is identical to the processing executed in the case of FIGS. 15A-15G.

At the time t3, when the engine output torque TQE falls below the upper limiting value TLU_SOS of the potentially hazardous area for sudden engagement, the controller 6 rapidly decreases the transmittable torque TLU in a stepwise fashion in the step S61 using the rapid decrease amount TLU_CUTDWN of transmittable torque of the lockup clutch 2 which is set equal to |ΔTQE1|+Tcnv_END. As a result, the upper limiting value TLU_SOS of the potentially hazardous area for sudden engagement also decreases by the same amount, and engine output torque TQE becomes larger than TLU_SOS. On the next and later occasions when the routine is performed, the determination in the step S59 again changes to negative and the controller 5 resumes increase processing of the differential pressure ΔP under open loop control in the step S70, and at a time t5, the operation mode of the lockup clutch 2 is shifted to the slip mode.

As described hereintofore, maintaining the transmittable torque TLU of the lockup clutch 2 at the decreased value for the predetermined time period T2 is preferable in view of compensating for a response delay of the engaging force of the lockup clutch 2.

However, such an arrangement is not an indispensable feature of this invention. As shown in FIGS. 15A-15G and FIGS. 16A-16G, even when the steps S69, S71 and S72 are omitted and open loop control of the differential pressure ΔP is immediately resumed after executing a rapid decrease processing of the transmittable torque of the lockup clutch 2, it is fully possible to achieve the object of this invention, i.e. preventing an unintentional engagement of the lockup clutch when the output torque of the engine is suddenly decreased while the differential pressure is increased by open loop control.

As described above, according to this invention, when the engine output torque TQE suddenly falls below the upper limiting value TLU_SOS of the potentially hazardous area for sudden engagement during open loop control of the differential pressure ΔP, the controller 5 rapidly decreases the transmittable torque TLU accordingly, and hence an unintentional engagement of the lockup clutch 2 is prevented. Thus prevention of a shock or vibration due to an unintentional engagement of the lockup clutch 2 is ensured.

The controller 5 sets the rapid decrease amount TLU_CUTDWN of transmittable torque of the lockup clutch 2 on the basis of the engine output torque variation amount ΔTQE1 during the predetermined period T1, and hence the engine output torque TQE does not fall below the transmittable torque TLU of the lockup clutch 2 as long as the engine output torque TQE decreases at a constant rate. It is therefore possible to prevent an unintentional engagement of the lockup clutch 2 while maintaining the engaging force thereof. Further, by causing the controller 5 to set the initial value of the rapid decrease amount TLU_CUTDWN of transmittable torque of the lockup clutch 2 equal to the sum of |ΔTQE1| and the open loop control termination converter torque Tcnv_END, a required converter torque Tcnv_END is ensured at a time point when open loop control is terminated, even if there is an error between the estimated engine output torque TQE and the real engine output torque or response delay in decreasing the transmittable torque TLU of the lockup clutch 2. Accordingly, it is possible to smoothly converge the real slip rotation speed Nslp to the open loop control termination slip rotation speed Nslp_end while preventing an unintentional engagement of the lockup clutch 2.

The controller 5 also maintains the transmittable torque TLU at the decreased value for the predetermined time period T2 after executing a rapid decrease processing of the transmittable torque TLU, Even when there is a response delay in rapid decrease in the transmittable torque TLU of the lockup clutch 2, the transmittable torque TLU is decreased to a target value during this period T2 without failure. Prevention of an unintentional engagement of the lockup clutch 2 is therefore ensured.

The controller 5 decreases the transmittable torque TLU by the amount equivalent to the engine output torque variation amount ΔTQE1 during the predetermined period T1, as long as the value of ΔTQE1 does not exceed the torque down determination reference value CUTDWN_JDG, even when the engine output torque TQE falls below the upper limiting value TLU_SOS of the potentially hazardous area for sudden engagement. Only when the value of ΔTQE1 exceeds the torque down determination reference value CUTDWN_JDG while TQE is below TLU_SOS, the controller 5 rapidly decreases the transmittable torque TLU of the lockup clutch 2. Hence, it is possible to make an accurate assessment of the hazard of an unintentional engagement of the lockup clutch 2. The smooth shifting of control of the differential pressure ΔP from open control to feedback control is realized while preventing an unintentional engagement of the lockup clutch 2.

By limiting the torque down determination reference value CUTDWN_JDG by an upper limiting value and a lower limiting value, prevention of an unintentional engagement of the lockup clutch 2 is ensured while at the same time avoiding excessive decrease in the transmittable torque TLU of the lockup clutch 2, even when the open loop control termination converter torque Tcnv_END takes an excessively large value or an excessively small value.

The contents of Tokugan 2005-189462, with a filing date of Jun. 29, 2005 in Japan, are hereby incorporated by reference.

Although the invention has been described above by reference to certain embodiments of the invention, the invention is not limited to the embodiments described above. Modifications and variations of the embodiments described above will occur to those skilled in the art, within the scope of the claims.

The embodiments of this invention in which an exclusive property or privilege is claimed are defined as follows:

What is claimed is:

1. A lockup clutch engaging force control device of a torque converter for a vehicle which transmits torque via fluid between a pump impeller connected to an engine and a turbine runner connected to a transmission, the torque converter comprising a lockup clutch which engages the pump impeller and the turbine runner according to an engaging force, the device comprising:
   an engaging force regulating mechanism which regulates the engaging force; and
   a programmable controller programmed to:
      execute open loop control of the mechanism to increase the engaging force until a slip rotation speed of the pump impeller and the turbine runner reaches a given predetermined value;
      calculate an engine output torque of the engine; and
      control the mechanism to decrease the engaging force in the open loop control of the mechanism when the engine output torque has decreased in the open loop control of the mechanism, in accordance with a decrease amount of the engine output torque during a predetermined first time period,
   wherein, the controller is further programmed to:
      calculate a transmittable torque of the lockup clutch according to the engaging force; and
      determine that the engine output torque has decreased in the open loop control of the mechanism only when a value obtained by subtracting the transmittable torque of the lockup clutch from the engine output torque falls below a first predetermined value.

2. The lockup clutch engaging force control device as defined in claim 1, wherein the controller is further programmed to set the first predetermined value equal to a sum of a converter torque which is a torque transmitted via fluid when the slip rotation speed reaches the given predetermined value and the decrease amount of the engine output torque during the predetermined first time period.

3. The lockup clutch engaging force control device as defined in claim 2, wherein the controller is further programmed to decrease the engaging force of the lockup clutch when the decrease amount of the engine output torque during the predetermined first time period has exceeded a predetermined second value.

4. The lockup clutch engaging force control device as defined in claim 3, wherein the controller is further programmed to set an engaging force decrease amount which is applied when the controller decreases the engaging force of the lockup clutch on a basis of the decrease amount of the engine output torque during the predetermined first time period.

5. The lockup clutch engaging force control device as defined in claim 4, wherein the controller is further programmed to set the engaging force decrease amount equal to the sum of the decrease amount of the engine output torque during the predetermined first time period and the converter torque.

6. The lockup clutch engaging force control device as defined in claim 4, wherein the controller is further programmed to set the engaging force decrease amount equal to the sum of the decrease amount of the engine output torque during the predetermined first time period and the converter torque for a first occasion of decreasing the engaging force of the lockup clutch and set the engaging force decrease amount equal to the decrease amount of the engine output torque during the predetermined first time period for a second and later occasions of decreasing the engaging force of the lockup clutch.

7. The lockup clutch engaging force control device as defined in claim 3, wherein the controller is further programmed to maintain an engaging pressure at a decreased value for a predetermined second time period after decreasing the engaging force of the lockup clutch.

8. The lockup clutch engaging force control device as defined in claim 3, wherein the controller is further programmed to set the predetermined second value equal to the converter torque.

9. The lockup clutch engaging force control device as defined in claim 8, wherein the controller is further programmed to limit the predetermined second value with an upper limiting value when the converter torque is greater than the upper limiting value and limit the predetermined second value with a lower limiting value when the converter torque is smaller than the lower limiting value.

10. The lockup clutch engaging force control device as defined in claim 2, wherein the controller is further programmed to decrease the engaging force of the lockup clutch according to a decrease rate of the engine output torque when the decrease amount of the engine output torque during the predetermined first time period does not exceed a predetermined second value.

11. The lockup clutch engaging force control device as defined in claim 1, wherein the controller is further programmed to execute feedback control of the mechanism after the slip rotation speed has reached the given predetermined value to realize the engaging force at which the slip rotation speed is equal to a target value.

12. A lockup clutch engaging force control device of a torque converter for a vehicle which transmits torque via fluid between a pump impeller connected to an engine and a turbine runner connected to a transmission, the torque converter comprising a lockup clutch which engages the pump impeller and the turbine runner according to an engaging force, the device comprising:
an engaging force regulating mechanism which regulates the engaging force;
means for executing open loop control of the mechanism to increase the engaging force until a slip rotation speed of the pump impeller and the turbine runner reaches a given predetermined value;
means for calculating an engine output torque of the engine;
means for controlling the mechanism to decrease the engaging force in the open loop control of the mechanism when the engine output torque has decreased in the open loop control of the mechanism, in accordance with a decrease amount of the engine output torque during a predetermined first time period;
means for calculating a transmittable torque of the lockup clutch according to the engaging force; and
means for determining that the engine output torque has decreased in the open loop control of the mechanism only when a value obtained by subtracting the transmittable torque of the lockup clutch from the engine output torque falls below a first predetermined value.

13. A lockup clutch engaging force control device of a torque converter for a vehicle which transmits torque via fluid between a pump impeller connected to an engine and a turbine runner connected to a transmission, the torque converter comprising a lockup clutch which engages the pump impeller and the turbine runner according to an engaging force, the device comprising:
an engaging force regulating mechanism which regulates the engaging force; and
a programmable controller programmed to:
execute open loop control of the mechanism to increase the engaging force until a slip rotation speed of the pump impeller and the turbine runner reaches a given predetermined value;
calculate an engine output torque of the engine; and
control the mechanism to decrease the engaging force in the open loop control of the mechanism when the engine output torque has decreased in the open loop control of the mechanism, in accordance with a decrease amount of the engine output torque during a predetermined first time period,
wherein, the controller is further programmed to:
calculate a transmittable torque of the lockup clutch according to the engaging force; and
determine that the engine output torque has decreased in the open loop control of the mechanism after a value obtained by subtracting the transmittable torque of the lockup clutch from the engine output torque falls below a first predetermined value.

14. The lockup clutch engaging force control device as defined in claim 13, wherein the controller is further programmed to set the first predetermined value equal to a sum of a converter torque which is a torque transmitted via fluid when the slip rotation speed reaches the given predetermined value and the decrease amount of the engine output torque during the predetermined first time period.

15. The lockup clutch engaging force control device as defined in claim 14, wherein the controller is further programmed to decrease the engaging force of the lockup clutch when the decrease amount of the engine output torque during the predetermined first time period has exceeded a predetermined second value.

16. The lockup clutch engaging force control device as defined in claim 15, wherein the controller is further programmed to set an engaging force decrease amount which is applied when the controller decreases the engaging force of the lockup clutch on a basis of the decrease amount of the engine output torque during the predetermined first time period.

17. The lockup clutch engaging force control device as defined in claim 15, wherein the controller is further programmed to maintain an engaging pressure at a decreased value for a predetermined second time period after decreasing the engaging force of the lockup clutch.

18. The lockup clutch engaging force control device as defined in claim 15, wherein the controller is further programmed to set the predetermined second value equal to the converter torque.

19. The lockup clutch engaging force control device as defined in claim 14, wherein the controller is further programmed to decrease the engaging force of the lockup clutch according to a decrease rate of the engine output torque when the decrease amount of the engine output torque during the predetermined first time period does not exceed a predetermined second value.

* * * * *